US012587803B2

(12) United States Patent (10) Patent No.: US 12,587,803 B2
Kotani et al. (45) Date of Patent: Mar. 24, 2026

(54) INFORMATION PROCESSING APPARATUS AND INFORMATION PROCESSING METHOD

(71) Applicant: SONY GROUP CORPORATION, Tokyo (JP)

(72) Inventors: Rina Kotani, Tokyo (JP); Shiro Suzuki, Tokyo (JP); Chisato Kemmochi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 256 days.

(21) Appl. No.: 18/262,056

(22) PCT Filed: Dec. 7, 2021

(86) PCT No.: PCT/JP2021/044926
§ 371 (c)(1),
(2) Date: Jul. 19, 2023

(87) PCT Pub. No.: WO2022/163137
PCT Pub. Date: Aug. 4, 2022

(65) Prior Publication Data
US 2024/0089686 A1 Mar. 14, 2024

(30) Foreign Application Priority Data
Jan. 27, 2021 (JP) ................................. 2021-010786

(51) Int. Cl.
*H04S 7/00* (2006.01)
*H04N 21/2187* (2011.01)
(Continued)

(52) U.S. Cl.
CPC ......... *H04S 7/302* (2013.01); *H04N 21/2187* (2013.01); *H04N 21/42203* (2013.01);
(Continued)

(58) Field of Classification Search
None
See application file for complete search history.

(56) References Cited

U.S. PATENT DOCUMENTS 9,066,144 B2 * 6/2015 Yerli .................. H04N 21/4756
11,070,849 B2 * 7/2021 Bathory ................ H04N 7/147
(Continued)

FOREIGN PATENT DOCUMENTS

JP 11-25188 A 1/1999
JP 2000-137492 A 5/2000
(Continued)

OTHER PUBLICATIONS

International Search Report and Written Opinion of PCT Application No. PCT/JP2021/044926, issued on Mar. 15, 2022, 08 pages of ISRWO.

*Primary Examiner* — Paul W Huber
(74) *Attorney, Agent, or Firm* — CHIP LAW GROUP

(57) ABSTRACT

Provided is an information processing apparatus including a control unit that performs control for selecting individual pseudo sound data corresponding to acquired reaction information indicating a reaction of a participant from one or more pieces of individual pseudo sound data reflecting a feature of a sound uttered by the participant. Further, the control unit outputs the selected individual pseudo sound data from an audio output apparatus installed in a venue.

15 Claims, 21 Drawing Sheets

(51) Int. Cl.
  *H04N 21/422* (2011.01)
  *H04N 21/439* (2011.01)
  *H04N 21/478* (2011.01)

(52) U.S. Cl.
  CPC ....... *H04N 21/4394* (2013.01); *H04N 21/478* (2013.01); *H04S 7/305* (2013.01); *H04S 2400/11* (2013.01); *H04S 2400/13* (2013.01); *H04S 2420/07* (2013.01)

(56) References Cited

U.S. PATENT DOCUMENTS

| | | | |
|---|---|---|---|
| 11,985,360 B2 * | 5/2024 | Bathory | ................. G06T 13/40 |
| 12,342,255 B2 * | 6/2025 | Padgett | .............. G07C 9/00944 |

| | | | | |
|---|---|---|---|---|
| 2014/0317673 | A1 * | 10/2014 | Murugan | ............ H04L 12/1895 |
| | | | | 725/116 |
| 2020/0359108 | A1 * | 11/2020 | Lee | ........................ H04H 60/33 |
| 2020/0404219 | A1 * | 12/2020 | Yerli | ........................ G06T 19/20 |
| 2021/0377615 | A1 * | 12/2021 | DeWitt | ............ H04N 21/41415 |
| 2022/0053218 | A1 * | 2/2022 | Malecki | ............. H04N 21/4753 |
| 2023/0224539 | A1 * | 7/2023 | Murugan | ......... H04N 21/44218 |
| | | | | 725/12 |

FOREIGN PATENT DOCUMENTS

| | | | |
|---|---|---|---|
| JP | 2014063145 A | 4/2014 |
| JP | 2015-507855 A | 3/2015 |
| JP | 2015-97318 A | 5/2015 |
| JP | 2015-125647 A | 7/2015 |
| JP | 2018-028646 A | 2/2018 |

* cited by examiner

50: INDIVIDUAL PSEUDO SOUND
GENERATION SERVER

530

STORAGE UNIT

· TEMPLATE CLAPPING SOUND DATA
· TEMPLATE CHEERING SOUND DATA
· FEATURE EXTRACTION PROGRAM

510

COMMUNICATION UNIT

520

CONTROL UNIT

523

STORAGE
CONTROL UNIT

521

REAL SOUND
ANALYSIS UNIT

522

INDIVIDUAL
PSEUDO SOUND
DATA
GENERATION UNIT

OPERATION TIMING

INDIVIDUAL PSEUDO CLAPPING
SOUND DATA TO BE REPRODUCED

TRIGGER
OPERATION TIMING
TIME

AMPLITUDE

PSEUDO CHEERING SOUND DATA
TO BE REPRODUCED
TIME

TRIGGER      OPERATION TIMING      TIME

PSEUDO CHEERING SOUND DATA
TO BE REPRODUCED

SYNTHESIZED CHEERING SOUND

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2021/044926 filed on Dec. 7, 2021, which claims priority benefit of Japanese Patent Application No. JP 2021-010786 filed in the Japan Patent Office on Jan. 27, 2021. Each of the above-referenced applications is hereby incorporated herein by reference in its entirety.

TECHNICAL FIELD

The present disclosure relates to an information processing apparatus, an information processing method, and a program.

BACKGROUND ART

With the recent development of communication technology, so-called live distribution for distributing a video of an event such as a concert, a seminar, and a play in real time is being performed. In such live distribution, the ambiance of a live event attracting audiences in the related art and two-way communication between a performer and an audience are challenges.

For collection of reactions from audiences at a live distribution event, for example, PTL 1 below discloses performing feedback to a performer by acquiring quantitative information such as the number of taps of an audience as reaction data in real time, and displaying the acquired quantitative information on a display watched by the performer or outputting a sound reflecting the quantitative information from an earphone or the like worn by the performer.

CITATION LIST

Patent Literature

[PTL 1]
JP 2015-125647A

SUMMARY

Technical Problem

Here, in order to provide more realistic feedback with ambiance to the performer, it is conceivable to deliver, for example, a cheering sound of an audience watching the live distribution (hereinafter referred to as a participant) to the performer in real time, but a high bit rate is required to deliver high-quality sounds to the performer, and transmission problems may be caused. Further, it is conceivable to use sound effect materials such as prepared laughter, clapping, and cheering sounds, but the prepared sounds are uniform and lack the ambiance.

Therefore, the present disclosure proposes an information processing apparatus, an information processing method, and a program capable of reflecting the individuality of a participant and providing audio data corresponding to a reaction of the participant in consideration of transmission problems.

Solution to Problem

According to the present disclosure, an information processing apparatus including: a control unit configured to perform control for selecting individual pseudo sound data corresponding to acquired reaction information indicating a reaction of a participant from one or more pieces of individual pseudo sound data reflecting a feature of a sound uttered by the participant, and outputting the selected individual pseudo sound data from an audio output apparatus installed in a venue is proposed.

According to the present disclosure, an information processing apparatus including a control unit configured to perform: processing for reflecting a feature of a sound uttered by a participant in sound data of a template to generate individual pseudo sound data, and processing for storing the generated individual pseudo sound data in association with the participant is proposed.

According to the present disclosure, an information processing method including: performing, by a processor, control for selecting individual pseudo sound data corresponding to acquired reaction information indicating a reaction of a participant from one or more pieces of individual pseudo sound data reflecting a feature of a sound uttered by the participant, and outputting the selected individual pseudo sound data from an audio output apparatus installed in a venue is proposed.

According to the present disclosure, a program causing a computer to function as: a control unit configured to perform control for selecting individual pseudo sound data corresponding to acquired reaction information indicating a reaction of a participant from one or more pieces of individual pseudo sound data reflecting a feature of a sound uttered by the participant, and outputting the selected individual pseudo sound data from an audio output apparatus installed in a venue is proposed.

DESCRIPTION OF EMBODIMENTS

Hereinafter, preferred embodiments of the present disclosure will be described in detail with reference to the accompanying drawings. In the present specification and drawings, components having substantially the same functional configuration are denoted by the same reference signs, and redundant description thereof will be omitted.

Further, the description is assumed to be given in the following order.

1. Overview of Live Distribution System according to Embodiment of Present Disclosure
2. Generation of Individual Pseudo Sound Data
2-1. Configuration Example of Individual Pseudo Sound Generation Server 50
2-2. Flow of Generation of Individual Pseudo Clapping Sound Data
2-3. Flow of Generation of Individual Pseudo Cheering Sound Data
2-4. Others
3. Output of Individual Pseudo Sound Data
3-1. Configuration Example of Venue Server 20
3-2. Operation Processing Example
3-3. Output of Individual Pseudo Clapping Sound Data
(3-3-1. Clapping Operation)
(3-3-2. Parameter Adjustment of Individual Pseudo Clapping Sound Data)

3-4. Output of Individual Pseudo Cheering Sound Data
(3-4-1. Operation of Cheering Sound)
(3-4-2. Parameter Adjustment of Individual Pseudo Cheering Sound Data)
4. Modification Example
4-1. Generation of Individual Echo Pseudo Sound Data
4-2. Configuration Example of Venue Server 20*a*
4-3. Processing for Adding Transfer Characteristic
5. Supplements

Figure 1:
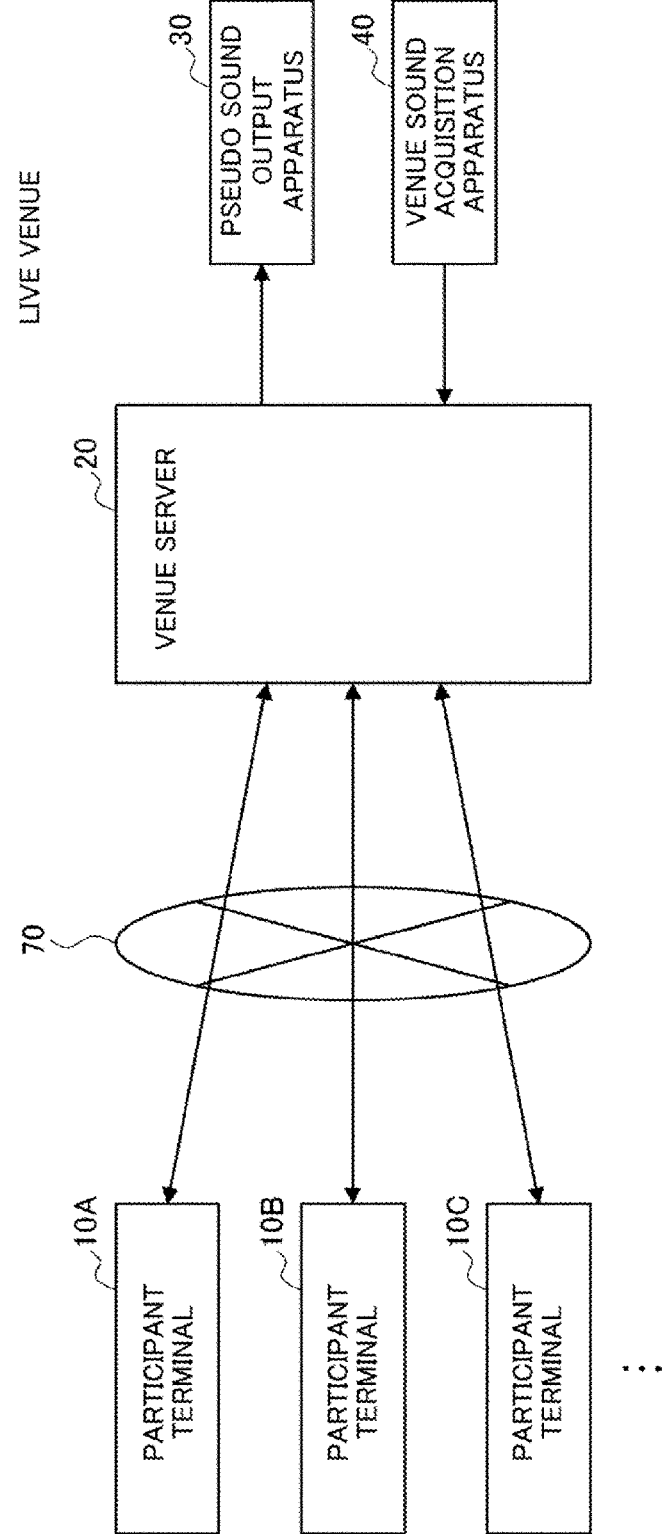
FIG. 1 is a diagram illustrating an overview of a live distribution system according to an embodiment of the present disclosure.

1. Overview of Live Distribution System According to Embodiment of Present Disclosure FIG. 1 is a diagram illustrating an overview of a live distribution system according to an embodiment of the present disclosure. As illustrated in FIG. 1, the live distribution system according to the present embodiment includes a venue server 20 (information processing apparatus) that performs the live distribution, and participant terminals 10 (10A to 10C, . . . ) that are used by respective participants watching the live distribution. The participant terminal 10 and the venue server 20 are communicatively connected via a network 70 to perform transmission and reception of data. Further, at a live venue, a pseudo sound output apparatus 30 (audio output apparatus) that outputs audio data according to the reaction of the participant, and a venue sound acquisition apparatus 40 (audio collection apparatus) that collects an audio (performance or the like) of the venue are disposed. The venue server 20 communicatively connects to the pseudo sound output apparatus 30 and the venue sound acquisition apparatus 40 to perform transmission and reception of data.

The participant terminal 10 is an example of an information processing apparatus used when the participant watches the live video distributed by the venue server 20. The participant can watch the live distribution using the participant terminal 10 at a place different from the live venue. For example, the participant terminal 10 may be realized by a smartphone, a tablet terminal, a personal computer (PC), an HMD, a wearable device, a projector, or the like. Further, the participant terminal 10 may be configured of a plurality of apparatuses.

The live distribution system according to the present embodiment is an information processing system capable of delivering a video and audio of a real venue (also referred to as a live venue herein), in which concerts, seminars, speeches, plays, or the like are performed, to a participant at a place different from the real venue in real time via the network 70, and also delivering reactions of the participant to the real venue in real time. The sound of the venue is acquired by the venue sound acquisition apparatus 40 and output to the venue server 20. An example of the venue sound acquisition apparatus 40 may include an audio processing apparatus that collects and appropriately processes sound in the venue. More specifically, a mixer 42 (FIGS. 19 and 20) is used. The mixer 42 is an apparatus that individually adjusts various sound sources input from a microphone that collects vocal sound or a performance of the performer, an electronic musical instrument, various players (for example, a CD player, a record player, and a digital player), and the like, mixes the sound sources, and outputs the resultant sound source.

Further, the live distribution system according to the present embodiment provides, in real time, the reaction of the participant who is watching at a place different from the live venue to the performer in the live venue. This makes it possible to solve the lack of the ambiance, which is real pleasure of a live event attracting customers in the related art, which is a concern at the time of live distribution. Thus, in the present embodiment, it is possible to provide the ambiance of the live performance to a performer giving a performance in the live venue. Further, in the present embodiment, the individual pseudo sound data reflecting the individuality of the participant is prepared in the venue server 20, and control is performed so that the individual pseudo sound data is output in real time from the pseudo sound output apparatus 30 installed in the venue according to a reaction of the participant. This makes it possible to perform feedback with more ambiance rather than uniform feedback, and to eliminate transmission problems such as an increase or delay of a bit rate. For example, it is possible to realize the present system at a low bit rate.

Here, the individual pseudo sound data according to the present embodiment is individual pseudo sound data obtained by individually in a pseudo manner generating sounds that can be generated by participants, such as a clapping sound, a cheering sound, and a shouting sound. Examples of the "cheering sound" may include exclamations expected to be uttered during a live performance (for example, "Wow!", "Oh!", "Kya!", "Eh!", "Yay!" or the like). Examples of the "shouting sound" may include a name of a performer, a word of encore, and a word of praise. In the present embodiment, the description will focus on the handling of various sounds especially in live distribution.

Hereinafter, generation of individual pseudo sound data and control of output of the individual pseudo sound data, which are performed in the live distribution system according to the present embodiment, will be sequentially described.

2. Generation of Individual Pseudo Sound Data

In the present embodiment, individual pseudo sound data for each participant is generated in advance and stored in the venue server 20 before the start of live distribution. Here, the generation of the individual pseudo sound data will be specifically described with reference to FIGS. 2 to 8.

Figure 2:
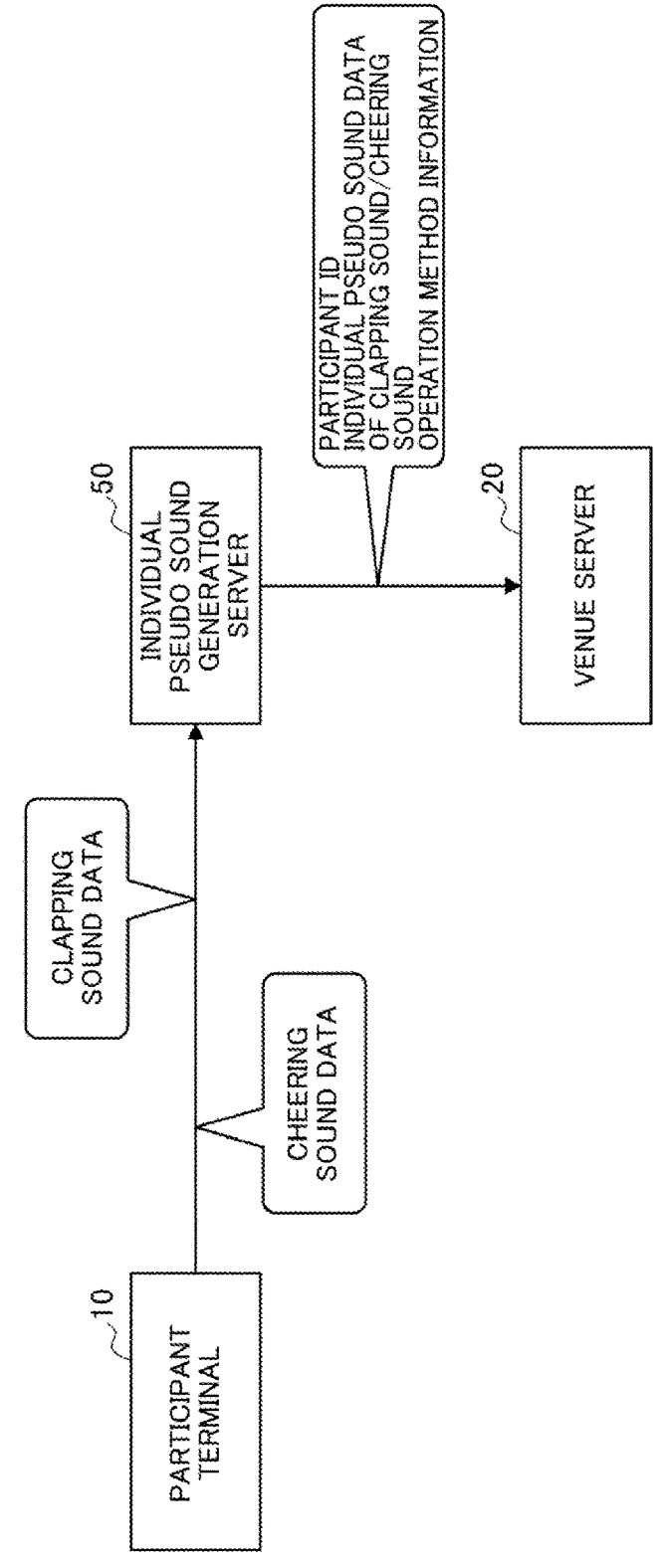
FIG. 2 is a diagram illustrating generation and storage of individual pseudo sound data according to the present embodiment.

FIG. 2 is a diagram illustrating generation and storage of individual pseudo sound data according to the present embodiment. The individual pseudo sound data according to the present embodiment is generated by the individual pseudo sound generation server 50, for example. The individual pseudo sound generation server 50 is an example of an information processing apparatus that generates individual pseudo sound data reflecting individuality of the participant on the basis of clapping sound data (real clapping sound of the participant) or cheering sound data (voice of the participant) collected from the participant terminal 10. The personality of the participant is a feature of a sound uttered by the participant. More specifically, the individual pseudo sound generation server 50 superimposes a feature (for example, a result of frequency analysis) extracted from real sound (the collected clapping sound data or cheering sound data) acquired from participant terminal 10 on prepared template clapping sound data or template cheering sound data (both are audio signals), thereby generating the individual pseudo sound data (that is, synthesis sound) of the clapping sound or cheering sound. Further, the individual pseudo sound generation server 50 also acquires from the participant terminal 10 setting information for the operation method of the participant who instructs the output of the generated individual pseudo sound data (herein referred to as "operation method information"). The individual pseudo sound generation server 50 outputs the generated individual pseudo sound data of the clapping sound and/or cheering sound and the operation method information to the venue server 20 in association with the ID of the participant and stores these in the venue server 20.

Hereinafter, the generation of such individual pseudo sound data will be described in greater detail.

2-1. Configuration Example of Individual Pseudo Sound Generation Server 50

Figure 3:
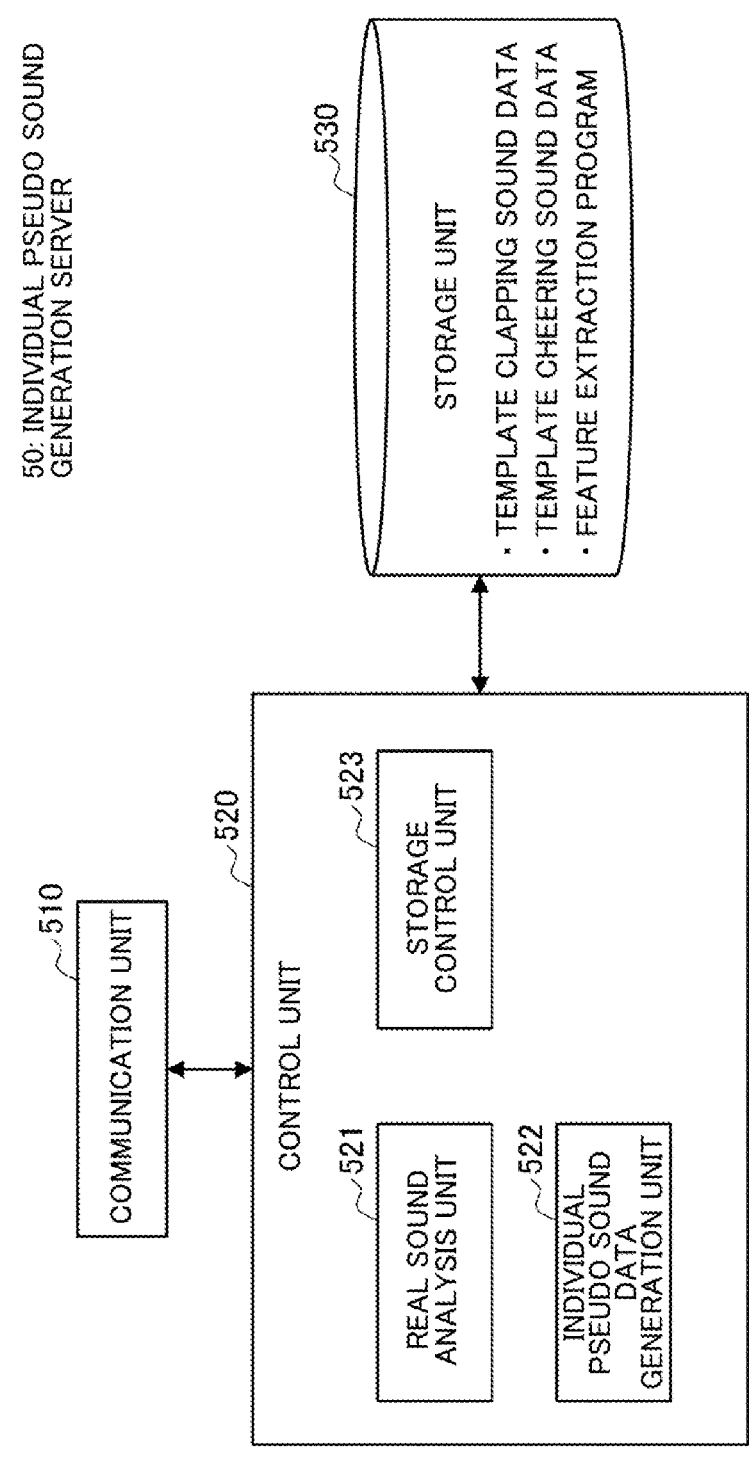
FIG. 3 is a block diagram illustrating an example of a configuration of a pseudo sound generation server according to the present embodiment.

FIG. 3 is a block diagram illustrating an example of a configuration of the individual pseudo sound generation server 50 according to the present embodiment. As illustrated in FIG. 3, the individual pseudo sound generation server 50 includes a communication unit 510, a control unit 520, and a storage unit 530.

(Communication Unit 510)

The communication unit 510 can communicatively connect to another apparatus wirelessly or by wire to perform transmission and reception of data. The communication unit 510 is realized by, for example, a wired/wireless local area network (LAN), Wi-Fi (registered trademark), Bluetooth (registered trademark), a mobile communication network (LTE (Long Term Evolution), 3G (third generation mobile communication system), 4G (fourth generation mobile communication system), or 5G (fifth generation mobile communication system)), or the like. For example, the communication unit 510 can perform transmission and reception of data to and from the participant terminals 10 and the venue server 20 via the network 70.

(Control Unit 520)

The control unit 520 functions as a calculation processing apparatus and a control apparatus, and controls an overall operation within the individual pseudo sound generation server 50 according to various programs. The control unit 520 is realized by an electronic circuit such as a central processing unit (CPU) or a microprocessor. Further, the control unit 520 may include a read only memory (ROM) that stores programs to be used, calculation parameters, or the like, and a random access memory (RAM) that temporarily stores appropriately changing parameters, or the like.

The control unit 520 according to the present embodiment also functions as a real sound analysis unit 521, an individual pseudo sound data generation unit 522, and a storage control unit 523. The real sound analysis unit 521 analyzes the actually collected clapping sound or cheering sound of the participants (sounds actually uttered by the participants) received from the participant terminals 10 via the communication unit 510. The participant terminal 10 collects a sound when the participant actually claps, a cheering sound, a shouting sound, or the like using a microphone (hereinafter referred to as a microphone), digitizes the sound, and transmits a digitalized signal (audio signal) to the individual pseudo sound generation server 50. Further, the real sound analysis unit 521 may perform frequency analysis as an example of the analysis and extract frequency characteristics as features. Further, the real sound analysis unit 521 may extract time characteristics as features as an example of the analysis. A feature extraction program (algorithm) can be stored in the storage unit 530.

Figure 4:
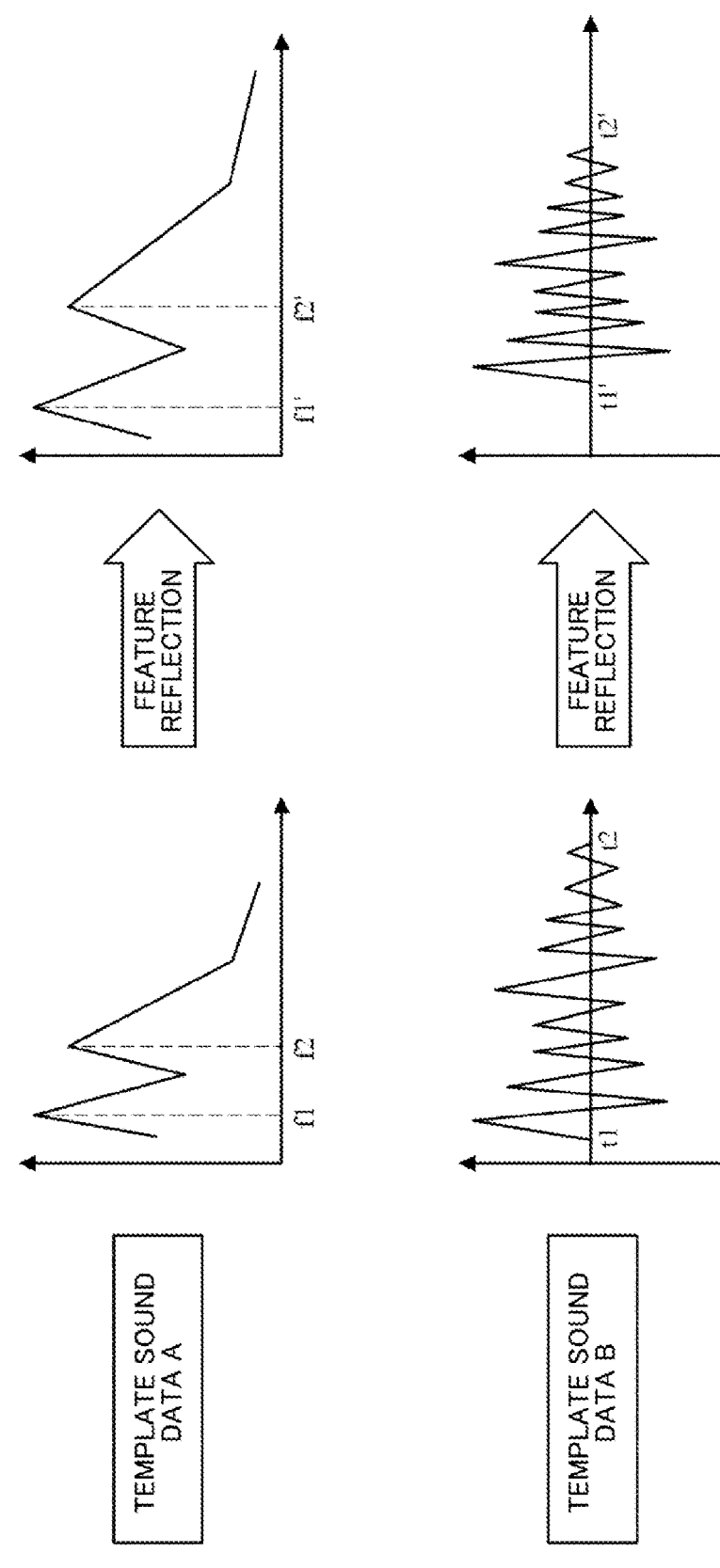
FIG. 4 is a diagram illustrating processing for superimposing an extracted feature of a participant on template sound data according to the present embodiment.

The individual pseudo sound data generation unit 522 superimposes an analysis result (the extracted feature, for example, frequency characteristic) of the real sound analysis unit 521 on sound data (clapping sound data or cheering sound data) of the prepared template, and generates the individual pseudo sound data of the clapping sound or cheering sound of each participant. FIG. 4 is a diagram illustrating processing for superimposing an extracted feature of a participant on template sound data according to the present embodiment.

An example illustrated in an upper part of FIG. 4 is an example of superimposing features in a frequency domain. For example, it is assumed that, when there are feature frequencies f1 and f2 in template sound data A (clapping sound data or cheering sound data of a template), features (frequency characteristic) of a certain participant are f1' and f2' shifted from the feature frequencies f1 and f2, as illustrated in the upper part of FIG. 4. In this case, the individual pseudo sound data generation unit 522 performs processing or transforming f1 of the template sound data A into f1' and f2 into f2'. In the example illustrated in the upper part of FIG. 4, since f1<f1' and f2<f2', the generated (individualized) individual pseudo clapping sound/cheering sound data is made to be heard as sound higher than the template sound data A. The present invention is not limited to the example illustrated in the upper part of FIG. 4, and any processing or transforming for reflecting a feature of a certain participant in the template sound data A, such as adding a new feature frequency f3 or reflecting not only the feature frequency, but also an inclination of the frequency or a larger tendency as features may be adopted.

A lower part of FIG. 4 illustrates an example of superimposing features in a time domain. For example, it is assumed that, when template sound data B (clapping sound data or cheering sound data of a template) has a start point t1 and an end point t2, features (frequency characteristic) of a certain participant are t1' and t2' shifted from the start point t1 and the end point t2, as illustrated in the lower part of FIG. 4 (consideration of time characteristics). In this case, the individual pseudo sound data generation unit 522 performs processing or changing t1 of the template sound data B into t1' and t2 into t2'. In the example illustrated in the lower part of FIG. 4, since |t2−t1|>|t2'−t1'|, a pitch is increased, and the generated (individualized) individual pseudo clapping sound/cheering sound data are heard as sound higher than the template sound data B. The present invention is not limited to the example illustrated in the lower part of FIG. 4, and an envelope of waveform information or a more global tendency may be reflected as features. In a large number of real clapping sounds or cheering sounds, start timings of individual clapping/cheering sound do not match and are scattered. Therefore, the start points t1/t1' are set to random values associated with an ID of each participant, making it possible to generate pseudo sound data of more natural clapping sound/cheering sound.

The template sound data is sound data of clapping or cheering sound prepared (recorded) in advance for the template. A plurality of patterns of template clapping sound data and template cheering sound data may be prepared. Even in the case of a clapping or cheering sound of the same person, features of the sound differ depending on a clapping method or a speaking method. For example, a clapping method of a single person may change during the event depending on a melody of a song to be watched in the live distribution, a degree of excitement of the person, or the like. Therefore, a plurality of patterns of clapping sounds with different hand forms may be generated. In this case, when the clapping sound of the participant is collected by the participant terminal 10, an instruction such as presenting an illustration of the form of the clapping is added, and the sound collection using the microphone and the analysis of the collected sound are repeated according to the number of patterns.

Further, the individual pseudo sound data to be generated is assumed to be, for example, one clapping sound, one cheering sound, and one shouting sound.

The storage control unit 523 performs control so that the generated individual pseudo sound data is stored in the venue server 20 in association with a participant ID. The storage control unit 523 also performs control so that the operation method information acquired from the participant terminal 10 is stored in the venue server 20 together with the participant ID and the generated individual pseudo sound data.

The pseudo sound data generation function of the individual pseudo sound generation server 50 has been described above. The pseudo sound data to be generated is not limited to the clapping sound or cheering sound, and may include a shouting sound, a sound of footsteps, and the like. Further, examples of the "shouting sound" may include a name of the performer, a specific word associated with the performer or song, a word of encore, and a word of praise.

Further, in the present embodiment, sound data prepared (recorded) in advance for a template is commonly used to generate individual pseudo sound data in which the characteristics of each participant are superimposed. When the sound collected by the participant terminal 10 is registered and used, there is concern that sounds (noise) other than clapping or voice are included, and a recording environment on the participant side is not with high quality (performance of the microphone, or the like) and noise or sound interruption is likely to occur, and thus, it is preferable to use prepared sound data for the template (noise is reduced with high-quality). The present embodiment is not limited thereto, and it is also possible to store a voice of the participant in advance and output the voice in the venue according to the operation of the participant during the live distribution.

(Storage Unit 530)

The storage unit 530 is realized by a read only memory (ROM) that stores programs, calculation parameters, or the like used in processing of the control unit 520, and a random access memory (RAM) that temporarily stores appropriately changing parameters, or the like. For example, the storage unit 530 stores the template clapping sound data, the template cheering sound data, the feature extraction program, and the like.

A configuration of the individual pseudo sound generation server 50 according to the present embodiment has been described above. The configuration of the individual pseudo sound generation server 50 illustrated in FIG. 3 is an example, and the present disclosure is not limited thereto. For example, the individual pseudo sound generation server 50 may be system configured of a plurality of apparatuses. Further, a function of the individual pseudo sound generation server 50 (generation of individual pseudo clapping sound data) may be realized by the venue server 20. Further, the function of the individual pseudo sound generation server 50 (generation of the individual pseudo clapping sound data) may be realized by the participant terminal 10.

Next, a flow of generation of individual pseudo clapping sound data and a flow of generation of individual pseudo cheering sound data according to the present embodiment will be specifically described.

2-2. Flow of Generation of Individual Pseudo Clapping Sound Data

Figure 5:
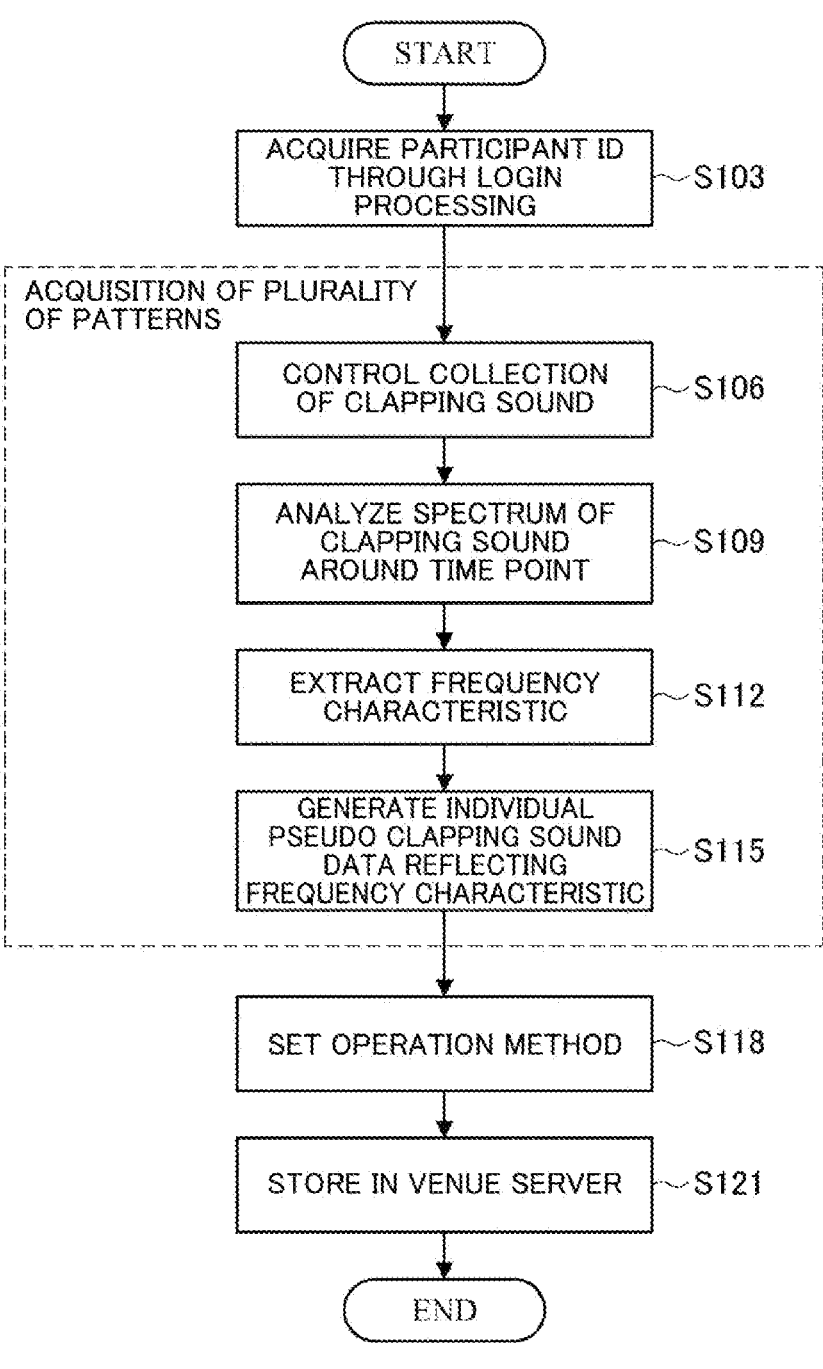
FIG. 5 is a flowchart illustrating an example of a flow of generation of individual pseudo clapping sound data according to the present embodiment.

FIG. 5 is a flowchart illustrating an example of a flow of generation of the individual pseudo clapping sound data according to the present embodiment. The processing illustrated in FIG. 5 is performed before a live distribution event starts.

As illustrated in FIG. 5, first, the participant uses the participant terminal 10 to perform login processing to a service (live distribution service) provided by the present system, and the control unit 520 of the individual pseudo sound generation server 50 acquires the participant ID (identification information of the participant) (step S103). The login screen may be provided by the individual pseudo sound generation server 50.

Next, the control unit 520 of the individual pseudo sound generation server 50 performs control so that the participant terminal 10 performs collection of the clapping sound (real sound) of the participant (step S106). Specifically, the individual pseudo sound generation server 50 displays an instruction for collecting the clapping sound on the display unit of the participant terminal 10, and collects the clapping sound with the microphone of the participant terminal 10. The display unit of the participant terminal 10 may be a display apparatus such as a liquid crystal display (LCD) or an organic electro luminescence (EL) display. Further, the display unit of the participant terminal 10 may be a projector that projects an image onto a screen or a wall. Further, when the participant terminal 10 is a transparent head mounted display (HMD) that is worn on a head of the participant, an instruction may be displayed in augmented reality (AR) on a transparent display unit disposed in front of the participant. Further, the participant terminal 10 may communicatively connect to various display apparatuses and perform control for displaying an instruction.

Figure 6:
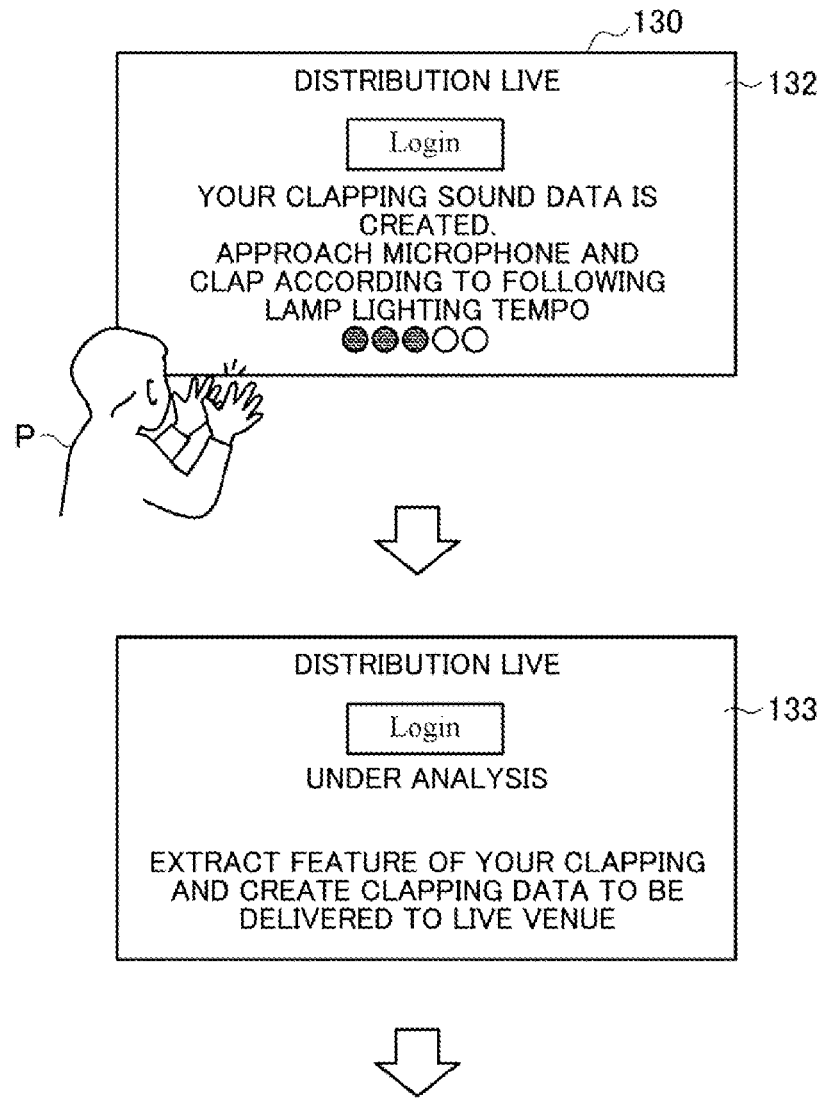
FIG. 6 is a diagram illustrating an example of a display screen for instructions to a participant in clapping sound collection according to the present embodiment.

Here, an example of a display screen of an instruction to a participant in clapping sound collection according to the present embodiment is illustrated in FIG. 6. As illustrated in an upper part of FIG. 6, first, the control unit 520 of the individual pseudo sound generation server 50 displays a screen 132 showing that the clapping sound of the participant is collected by a microphone input of the participant terminal 10 on the display unit 130 of the participant terminal 10. Here, as an example, in order to more accurately extract the feature of the clapping sound, a time point at which clapping is performed is presented to the participant. Specifically, for example, five marks are sequentially lit every second on the screen to instruct the participant to clap as evenly as possible according to the lighting. In this case, a clap form may also be presented as an illustration. The participant claps five times according to the instruction and the time point displayed on the screen. Further, in order to improve detection accuracy of feature extraction, clapping is performed a plurality of times (for example, five times). The real sound analysis unit 521 of the individual pseudo sound generation server 50 may use second and subsequent sounds among clapping sounds according to a plurality of time points as analysis target data because a participant is not accustomed to a first sound and accuracy is degraded. Further, the real sound analysis unit 521 of the individual pseudo sound generation server 50 may average the clapping sound for a plurality of times to obtain data that is an analysis target.

Next, the real sound analysis unit 521 calculates the frequency characteristic of the collected clapping sound around a time point, which is a time point when the mark is lit every second (steps S106 and S109). Specifically, for example, the real sound analysis unit 521 performs spectrum analysis on the clapping sound with reference to a time point, and extracts frequency characteristic from spectrum information.

Next, the real sound analysis unit 521 superimposes the frequency characteristic on the clapping sound data of the template to perform generation of the individual pseudo clapping sound data reflecting the characteristics (individuality) of the participant (step S115). Superimposition of the feature (frequency characteristic) is as described above with reference to FIG. 4.

While such analysis and generation are being performed, the control unit 520 may display a screen 133 indicating "under analysis" as illustrated in the middle of FIG. 6 on the display unit 130.

Further, since it is assumed that the same person will clap with different features, the individual pseudo sound generation server 50 may repeat the processing shown in steps S106 to S115 a plurality of times to generate a plurality of pieces of individual pseudo clapping sound data. For example, the individual pseudo sound generation server 50 may present an instruction, illustration, or the like to make a hand form at the time of clapping, strength of clapping (strong or weak), a timing (fast or slow), or the like different, acquire a plurality of patterns of clapping sounds (real sounds) of participants, analyze the clapping sounds, and generate a plurality of pieces of individual pseudo clapping sound data.

Subsequently, when both the analysis of the clapping sound and the generation of the individual pseudo clapping sound data end, the individual pseudo sound generation server 50 performs setting of the method of operating the individual pseudo clapping sound data that is performed during the live distribution event (step S118). The individual pseudo sound generation server 50 displays, for example, a screen 134 showing an explanation of the operation method, or the like, as illustrated in a lower part of FIG. 6, to prompt the participant to set the operation method.

As an operation method, for example, when the microphone input of the participant terminal 10 is permitted during the event, an actual clapping timing of the participant or the like can be used as reaction information (clap output command). Further, examples of an operation method in which a microphone is not used may include clicking an icon displayed on the screen during the event (clicking with a mouse or tapping with a finger, electronic pen, or the like), operating a predetermined key on a keyboard, a gesture (detected by a camera), a button operation of a controller, and an operation of shaking a controller (for example, a penlight). Further, a motion of an arm or the like detected by a sensor attached to an arm or the like of the participant may be used.

The storage control unit 523 of the individual pseudo sound generation server 50 transmits the one or more generated pieces of individual pseudo clapping sound data and the operation method information indicating the set operation method to the venue server 20 in association with the participant ID (step S121). The venue server 20 stores the participant ID, the one or more pieces of individual pseudo clapping sound data, and the operation method information in the storage unit in association with each other.

2-3. Flow of Generating Individual Pseudo Cheering Sound Data

Next, a flow of generation of individual pseudo cheering sound data will be described with reference to FIGS. 7 and 8.

Figure 7:
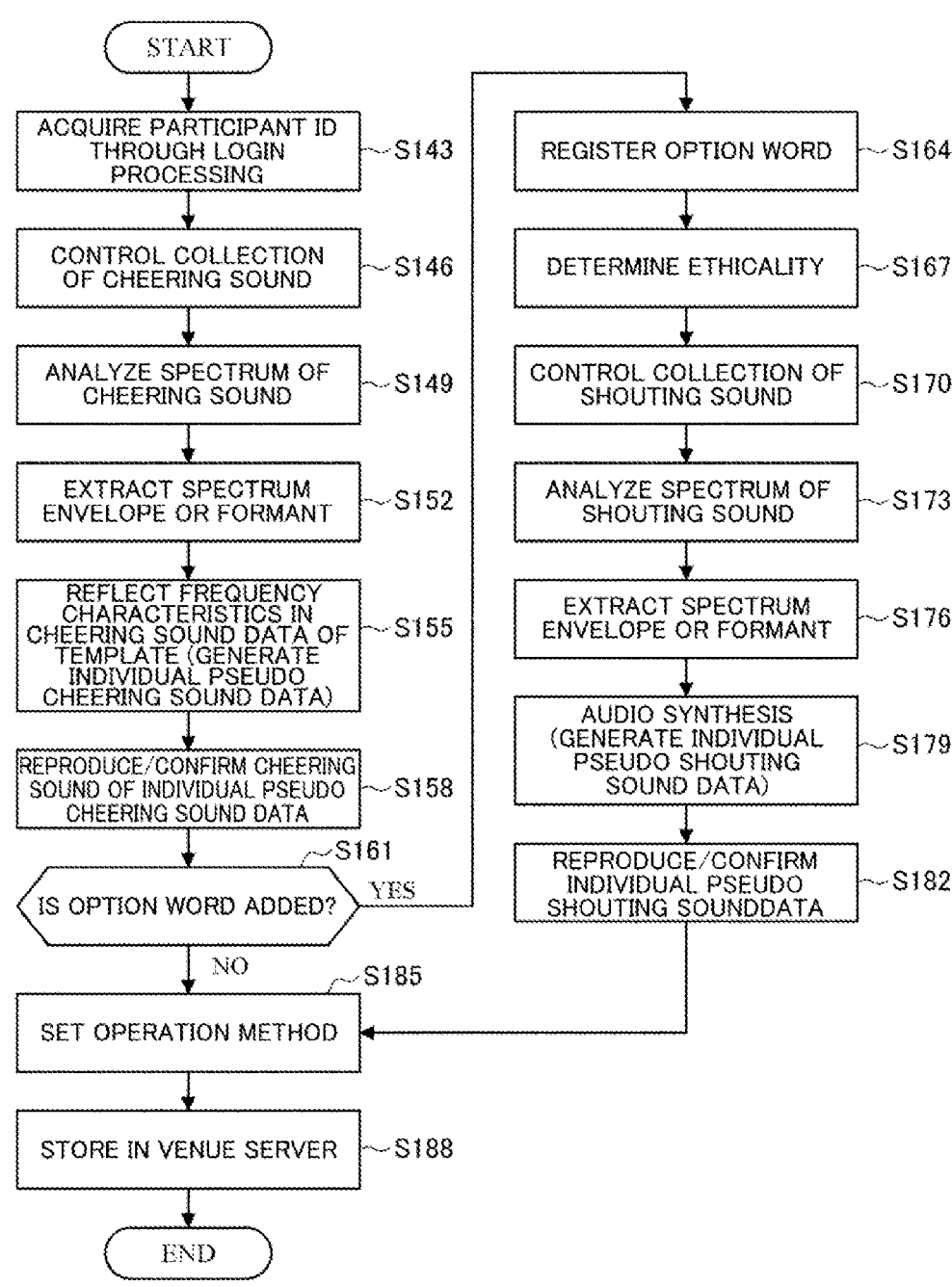
FIG. 7 is a flowchart illustrating an example of a flow of generation of individual pseudo cheering sound data according to the present embodiment.

FIG. 7 is a flowchart illustrating an example of a flow of generation of individual pseudo cheering sound data according to the present embodiment. As illustrated in FIG. 7, first, the control unit 520 of the individual pseudo sound generation server 50 acquires a participant ID (step S143). As described with reference to FIG. 5, the participant ID may be acquired from the login processing performed by the participant, or a case in which generation of the individual pseudo cheering sound data is performed following the generation of the individual pseudo clapping sound data can be said to be a state in which the participant ID is acquired continuously from the login processing shown in step S103.

Next, the control unit 520 of the individual pseudo sound generation server 50 performs control so that the participant terminal 10 performs collection of cheering sound (real sound) of the participant (step S146). Specifically, the individual pseudo sound generation server 50 displays an instruction for collecting cheering sound on the display unit of the participant terminal 10 and collects the cheering sound with the microphone of the participant terminal 10. Here, FIG. 8 illustrates an example of a display screen for instructions to the participants in cheering sound collection according to the present embodiment. As illustrated in an upper part of FIG. 8, first, the control unit 520 of the individual pseudo sound generation server 50 displays a screen 135 showing that the cheering sound of the participant is collected through microphone input of the participant terminal 10 on the display unit 130 of the participant terminal 10. Here, as an example, a screen instructing an input within three seconds after a dial tone sounds is displayed. Examples of the cheering sound may include various exclamations as described above, but the participants may select a cheering sound that the participants want to register, and then speak out. For example, the participant may speak out with the same exclamation as selected cheering sound, or may speak out with an exclamation different from the selected cheering sound. Features of a sound may be extracted from a voice of the participant and reflected in template pseudo cheering sound data of the selected exclamation, and individual pseudo cheering sound data may be generated. A plurality of patterns of cheering sounds may be prepared, or a single pattern may be prepared.

Next, the real sound analysis unit 521 analyzes the collected cheering sound and extracts features (steps S149 and S152). Specifically, for example, the real sound analysis unit 521 performs spectrum analysis on the collected cheering sound, and extracts a spectrum envelope or formant as a feature (frequency characteristic) from the spectrum information.

Subsequently, the real sound analysis unit 521 reflects the frequency characteristic in the cheering sound data of the prepared template to generate the individual pseudo cheering sound data (step S155). Since a cheering sound of a participant is likely to be unable to be completely reproduced at a place different from an atmosphere of the live venue, such as home, a feature of a voice of each participant is superimposed on prepared template cheering sound data, thereby generating the individual pseudo cheering sound data.

Figure 8:
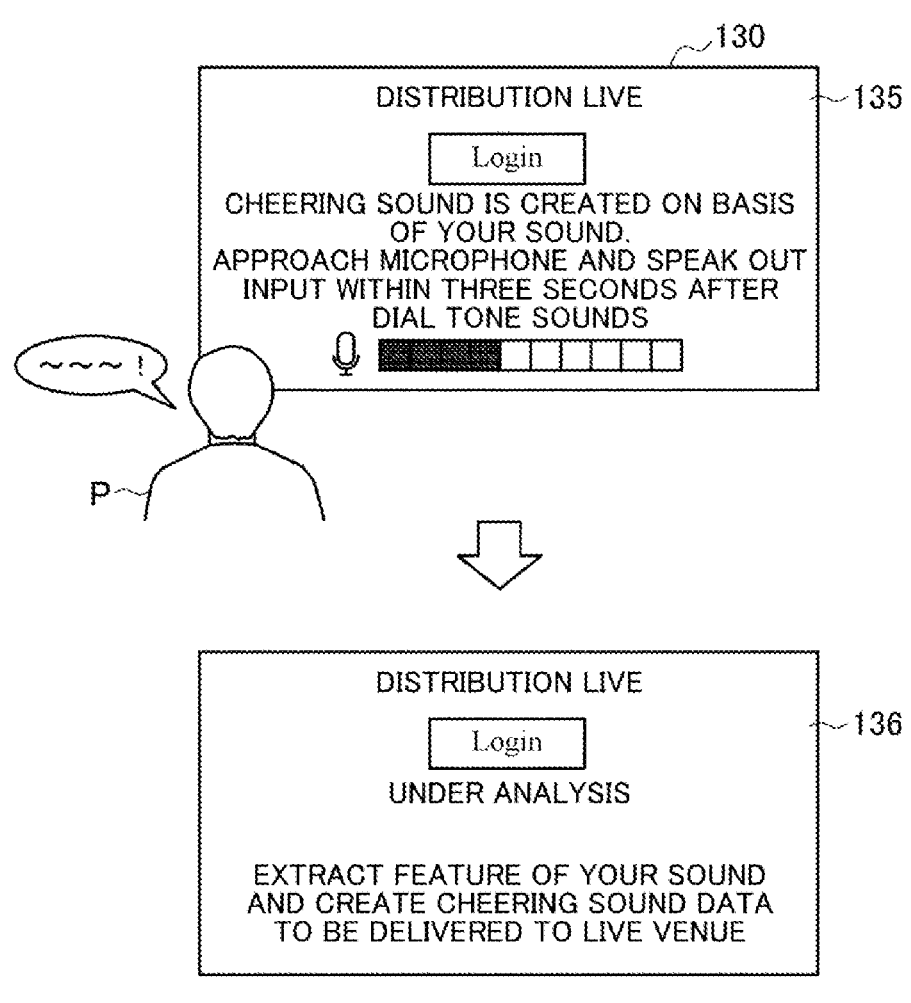
FIG. 8 is a diagram illustrating an example of a display screen for instructions to a participant in cheering sound collection according to the present embodiment.
Figure 8:
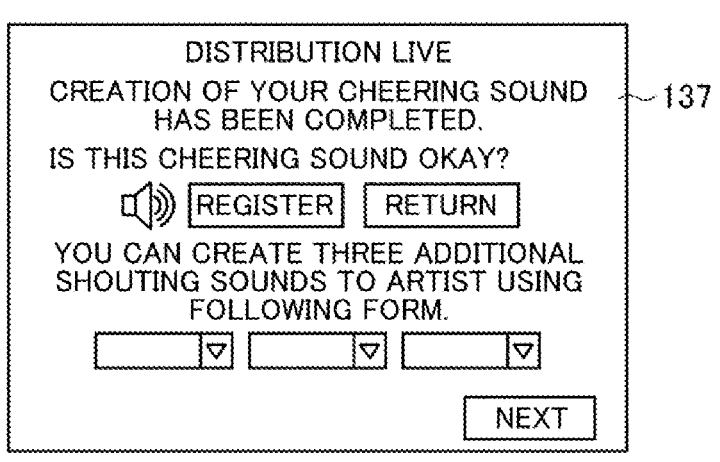

While such analysis and generation are being performed, the control unit 520 may display a screen 136 indicating "under analysis" as illustrated in the middle of FIG. 8 on the display unit 130.

Next, the individual pseudo sound generation server 50 may reproduce the generated individual pseudo cheering sound data to allow the participant to check the individual pseudo cheering sound (step S158). For example, the individual pseudo sound generation server 50 displays a screen 137 prompting confirmation of the individual pseudo cheering sound data on the display unit 130, as illustrated in a lower part of FIG. 8. When the individual pseudo cheering sound data is to be generated again, a "return" button on the screen 137 can be selected and the collection of the cheering sound can be performed again. That is, steps S146 to S158 are repeated.

Further, when there is a shouting sound or the like that is frequently used at the event, the participant can add an option word (step S161). For example, the participant can select a word to be added from words (shouting sound) that can be added, according to a guidance displayed on the screen 137 illustrated in the lower part of FIG. 8. The live distributor can prepare candidates for the option word, such as a shouting sound of "encore", a name of an artist, or a fixed call to be made in a specific song, in advance.

Next, when the option word is added (step S161/Yes), the individual pseudo sound generation server 50 first performs registration of the option word (step S164). For registration of the option word, for example, the participant uses the participant terminal 10 to select a word to be added in each form displayed on the screen 137 illustrated in the lower part of FIG. 8 (for example, presented as a word that can be selected in a pull-down scheme in each form).

Next, the individual pseudo sound generation server 50 determines whether or not an input word is a word that should not be ethically uttered, through collation using a specific dictionary (for example, a prohibited word list) such as a corpus (step S167). Such ethics determination processing may be skipped when selection from candidates prepared by the performer in advance is performed. It is also possible for the participant to freely add an option word, and in this case, for example, a determination can be made by collation with the prohibited word list prepared by the performer in advance. When a word included in the prohibited word list is input, the individual pseudo sound generation server 50 notifies the participant that the word cannot be registered.

Next, when a word that can be registered is input, the individual pseudo sound generation server 50 performs control so that collection of the shouting sound of the participant is performed (step S170). The participant speaks out a word to be added and inputs the word to the microphone of the participant terminal 10 according to an instruction.

Next, the real sound analysis unit 521 of the individual pseudo sound generation server 50 performs spectrum analysis on the collected shouting sound, and extracts a spectrum envelope or formant as a feature (frequency characteristic) from the spectrum information (step S176).

Next, the individual pseudo sound data generation unit 522 generates individual pseudo shouting sound data through audio synthesis using the extracted frequency characteristic (step S179). For the audio synthesis, a shouting sound of the prepared template by the performer may be used. Further, in the case of a word arbitrarily input by the participant, the individual pseudo sound data generation unit 522 may generate the shouting sound of the template through audio synthesis on the basis of the input word (text), and superimpose the frequency characteristic on the generated shouting sound of the template to generate the individual pseudo shouting sound data.

Next, the individual pseudo sound generation server 50 may reproduce the generated individual pseudo shouting sound data to allow the participant to perform confirmation (step S182). When the participant inputs an instruction to redo the generation of the individual pseudo shouting sound data, the processing returns to step S170, and the sound collection is performed again. Further, when the participant inputs an instruction to further add an option word, the processing returns to step S164 to repeat the processing of adding an option word.

In the processing shown in steps S164 to S179, sound collection is performed and analysis is performed again each time an option word is registered, but the present embodiment is not limited thereto. For example, it is possible to collect a plurality of pieces of sample sound data from participants and combine the collected sample data with input option words to generate more general-purpose individual pseudo shouting sound data. This makes it possible to generate individual pseudo shouting sound data without performing sound collection or voice analysis each time.

Subsequently, when the generation of the individual pseudo cheering sound data or the like is all completed, the individual pseudo sound generation server 50 performs setting of the method of operating the individual pseudo cheering sound data or the like to be performed during the live distribution event (step S185). The individual pseudo sound generation server 50 displays a screen showing an explanation of the operation method, or the like on the display unit 130 of the participant terminal 10, and prompts the participant to set the operation method.

As an operation method, for example, clicking an icon displayed on the screen during the event (clicking with a mouse or tapping with a finger, electronic pen, or the like), operating a predetermined key on a keyboard can be used as reaction information (a command to output cheering sound, or the like). For example, when a plurality of pieces of individual pseudo sound data such as cheering sound or shouting sound are registered, corresponding icons are displayed on the display unit 130 during live distribution, and the participant can select the cheering sound or shouting sound to be output by operating the icon. Further, when the clapping operation is a microphone input, it is possible to simultaneously input the clapping sound and the cheering sound, and thus, an operation of the cheering sound may be performed by, for example, a foot controller operated by being stepped by the foot. The foot controller will be described below with reference to FIG. 14.

A cheering sound operation method is not limited to the example described above, and the cheering sound operation can be performed by a button operation of a hand-operated handy controller, gesture (detected by a camera, an acceleration sensor, or the like), or the like.

The storage control unit 523 of the individual pseudo sound generation server 50 transmits one or more generated pieces of individual pseudo cheering sound data or the like, and the operation method information indicating the set operation method to the venue server 20 in association with the participant ID (step S188). The venue server 20 stores the participant ID, the one or more pieces of individual pseudo cheering sound data, and the operation method information in the storage unit in association with each other.

2-4. Others

The generation of the individual pseudo sound data according to the present embodiment has been specifically described above. In the present embodiment, as an example, a case in which the individual pseudo sound data is generated by the individual pseudo sound generation server 50 has been described, but the present disclosure is not limited thereto. For example, the participant terminal 10 may perform real sound analysis processing performed by the real sound analysis unit 521 and processing for generating the individual pseudo sound data performed by the individual pseudo sound data generation unit 522. Further, the participant terminal 10 performs processing up to the real sound analysis processing (feature extraction), and transmits the analysis result (extracted feature) or the operation method information to the individual pseudo sound generation server 50 together with the participant ID, and the individual pseudo sound generation server 50 may perform the processing for generating the individual pseudo sound data on the basis of the analysis result. When the participant terminal 10 performs the analysis of the real sound or the generation of the individual pseudo sound data, the individual pseudo sound generation server 50 appropriately transmits a necessary program, template sound, or the like to the participant terminal 10.

3. Output of Individual Pseudo Sound Data

Next, the output of the individual pseudo sound data during the live distribution will be described. In the present system, the venue server 20 outputs individual pseudo sound data corresponding to reactions of live participants to the live venue in real time during the live distribution. Specifically, the venue server 20 performs control for outputting the individual pseudo clapping sound data or the individual pseudo cheering sound data from the pseudo sound output apparatus 30 (speaker) installed in the live venue. This makes it possible to deliver real-time reactions of many participants to the performer who is performing live performance in the live venue, thereby increasing the ambiance of the live performance.

Hereinafter, a configuration of the venue server 20 that performs control for outputting the individual pseudo sound data in the present embodiment, and an example of operation processing will be sequentially described.

3-1. Configuration Example of Venue Server 20

Figure 9:
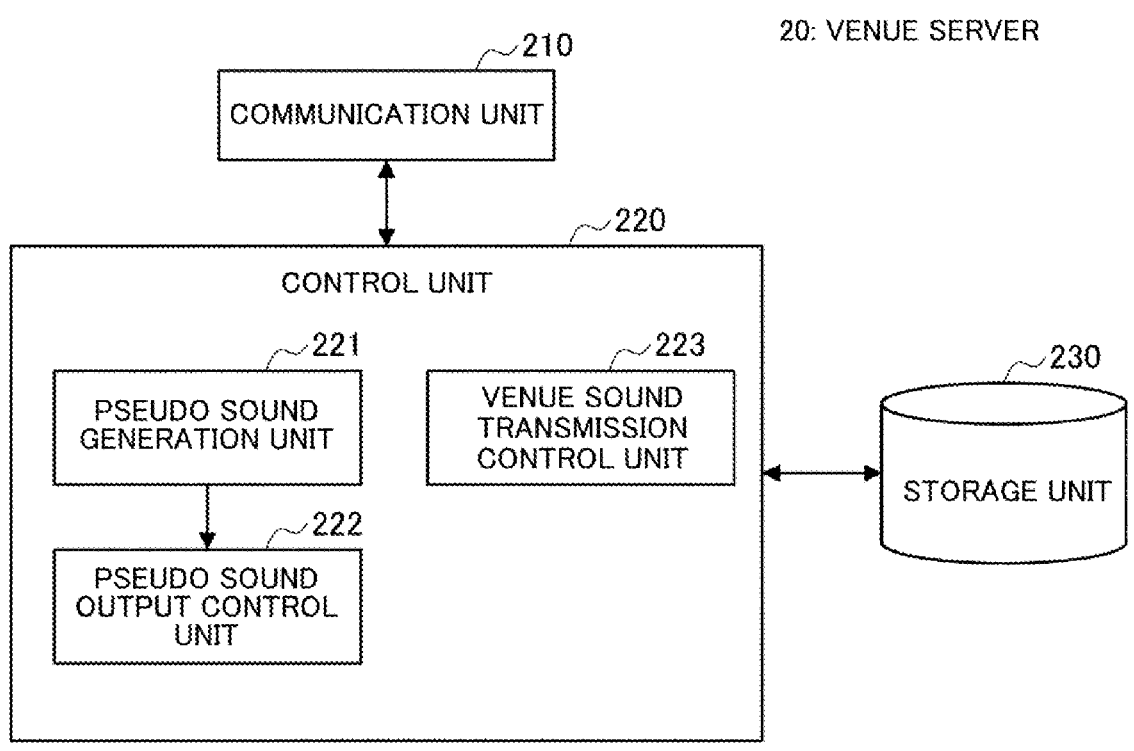
FIG. 9 is a block diagram illustrating an example of a configuration of a venue server according to the present embodiment.

FIG. 9 is a block diagram illustrating an example of a configuration of the venue server 20 according to the present embodiment. As illustrated in FIG. 9, the venue server 20 includes a communication unit 210, a control unit 220, and a storage unit 230.

(Communication Unit 210)

The communication unit 210 can perform transmission and reception of data by communicatively connecting to another apparatus wirelessly or by wire. The communication unit 210 is realized by, for example, a wired/wireless local area network (LAN) or the like. For example, the communication unit 210 can perform transmission and reception of data to and from the participant terminal 10 via the network 70. Further, the communication unit 210 transmits individual pseudo sound data to the pseudo sound output apparatus 30 provided in the live venue, or receives an audio signal of the venue from the venue sound acquisition apparatus 40 (a sound source collected from a microphone or musical instrument to which a voice of the performer is input).

(Control Unit 220)

The control unit 220 functions as a calculation processing apparatus and a control apparatus, and controls an overall operation within the venue server 20 according to various programs. The control unit 220 is realized by an electronic circuit such as a central processing unit (CPU) or a microprocessor. Further, the control unit 220 may include a read only memory (ROM) that stores programs to be used, calculation parameters, or the like, and a random access memory (RAM) that temporarily stores appropriately changing parameters, or the like.

Further, the control unit 220 according to the present embodiment functions as a pseudo sound generation unit 221, a pseudo sound output control unit 222, and a venue sound transmission control unit 223.

The pseudo sound generation unit 221 has a function of generating a pseudo sound to be output (reproduced) from the pseudo sound output apparatus 30 disposed in the venue. Specifically, the pseudo sound generation unit 221 selects the individual pseudo sound data according to the reaction information indicating the reaction of the participant received from the participant terminal 10 via the communication unit 210, and performs parameter adjustment on the selected individual pseudo sound data on the basis of the reaction information.

Here, an example of the "reaction information" may include operation information regarding an operation (action) of a clapping or cheering sound by the participant. The operation information may include, for example, the number of operations per unit time, an operation timing, an amount of operation (an amount of pressing), or selection operation information (ID of a selected item, or the like). Further, the operation information may include a spectrum obtained by frequency analysis of clapping sound input by the participant. Further, the operation information is operation information in each unit time (a certain period of time) and can be continuously transmitted from the participant terminals 10.

The pseudo sound generation unit 221 selects the individual pseudo sound data associated in advance with the number of operations per unit time (a certain period of time), the operation timing information, and the like on the basis of the operation information. Further, the pseudo sound generation unit 221 may acquire spectral information of the clapping sound actually performed by the participant as operation information, and select individual pseudo sound data similar to the spectral information. Further, in some cases, the selection of the individual pseudo sound data may be controlled from the performer according to a tone of a song being played in the live venue or content of the event. For example, when the song is a ballad song, it is also possible to perform a setting so that individual pseudo sound data of lightly clapping, individual pseudo sound data of clapping in which an exciting portion in a second half of an event is vigorous, or the like is selected. The clapping or cheering sound operation performed by the participants according to the present embodiment will be specifically described with reference to FIGS. 11 to 17.

Next, the pseudo sound generation unit 221 performs the parameter adjustment on the selected individual pseudo sound data on the basis of the operation information. For example, the pseudo sound generation unit 221 performs volume adjustment proportional to the number of operations, adjustment of an output timing according to the operation timing, or the like. This makes it possible to provide real-time reaction of each participant as more natural feedback with the ambiance.

The pseudo sound output control unit 222 performs control for outputting the individual pseudo sound data selected by the pseudo sound generation unit 221 and subjected to parameter adjustment, from the pseudo sound output apparatus 30. An example of the pseudo sound output apparatus 30 may include a small speaker (individual sound output apparatus) disposed at each audience seat in the live venue. For example, when a virtual position of the participant in the live venue (hereinafter referred to as a virtual position) is associated with the participant ID (an audience seat ID may be used), the pseudo sound output control unit 222 performs control for outputting the individual pseudo sound data of each participant from a small speaker installed at the virtual position of each participant. This makes it possible to hear the clapping sound, cheering sound, or the like of each participant from each audience seat in the live venue, and to give the ambiance to the performer as if the audience is actually present in the audience seat.

The small speakers may be provided in all the audience seats, or one small speaker may be provided in the plurality of audience seats. In order to give more realistic ambiance to the performer, it is preferable for small speakers to be provided in all the audience seats (at least positions in the venue assigned to the respective watching participants), but the present invention is not always limited thereto.

The venue sound transmission control unit 223 performs control for transmitting the venue sound (a venue sound signal) output from the venue sound acquisition apparatus 40 to each participant terminal 10. An example of the venue sound acquisition apparatus 40 may include a small microphone (individual sound collection apparatus) (hereinafter referred to as a small microphone) disposed at each audience seat in the live venue. For example, the venue sound transmission control unit 223 acquires the venue sound signal collected by a small microphone installed at the virtual position of the participant in the live venue, which is associated with the participant ID, and transmits the venue sound signal to the participant terminal 10 of the participant. The venue sound is collected by the small microphone installed in the audience seat corresponding to the virtual position, making it possible to obtain the venue sound including an echo of a space of the venue, a sense of perspective, and a sense of direction. This makes it possible to give the ambiance to the participant as if the participant actually listens in the audience seats of the live venue. That is, a sound from (a small speaker disposed at) a nearby audience seat can be heard nearby, and the reaction of each participant or the sound of the live performance can be heard along with the echo in the venue.

Further, the venue sound transmission control unit 223 may perform fine adjustment (such as normalization) on the venue sound signal and then perform transmission. For example, the venue sound transmission control unit 223 performs dynamic range adjustment or the like.
(Storage Unit 230)

The storage unit 230 is realized by a read only memory (ROM) that stores programs, calculation parameters, or the like used in processing of the control unit 220, and a random access memory (RAM) that temporarily stores appropriately changing parameters, or the like. For example, the storage unit 230 stores the individual pseudo sound data, operation method information, the virtual position in the venue, or the like in association with the participant ID.

The configuration of the venue server 20 according to the present embodiment has been described above. The configuration of the venue server 20 illustrated in FIG. 9 is an example, and the present disclosure is not limited thereto. For example, the venue server 20 may be configured of a plurality of apparatuses.

3-2. Operation Processing Example

Figure 10:
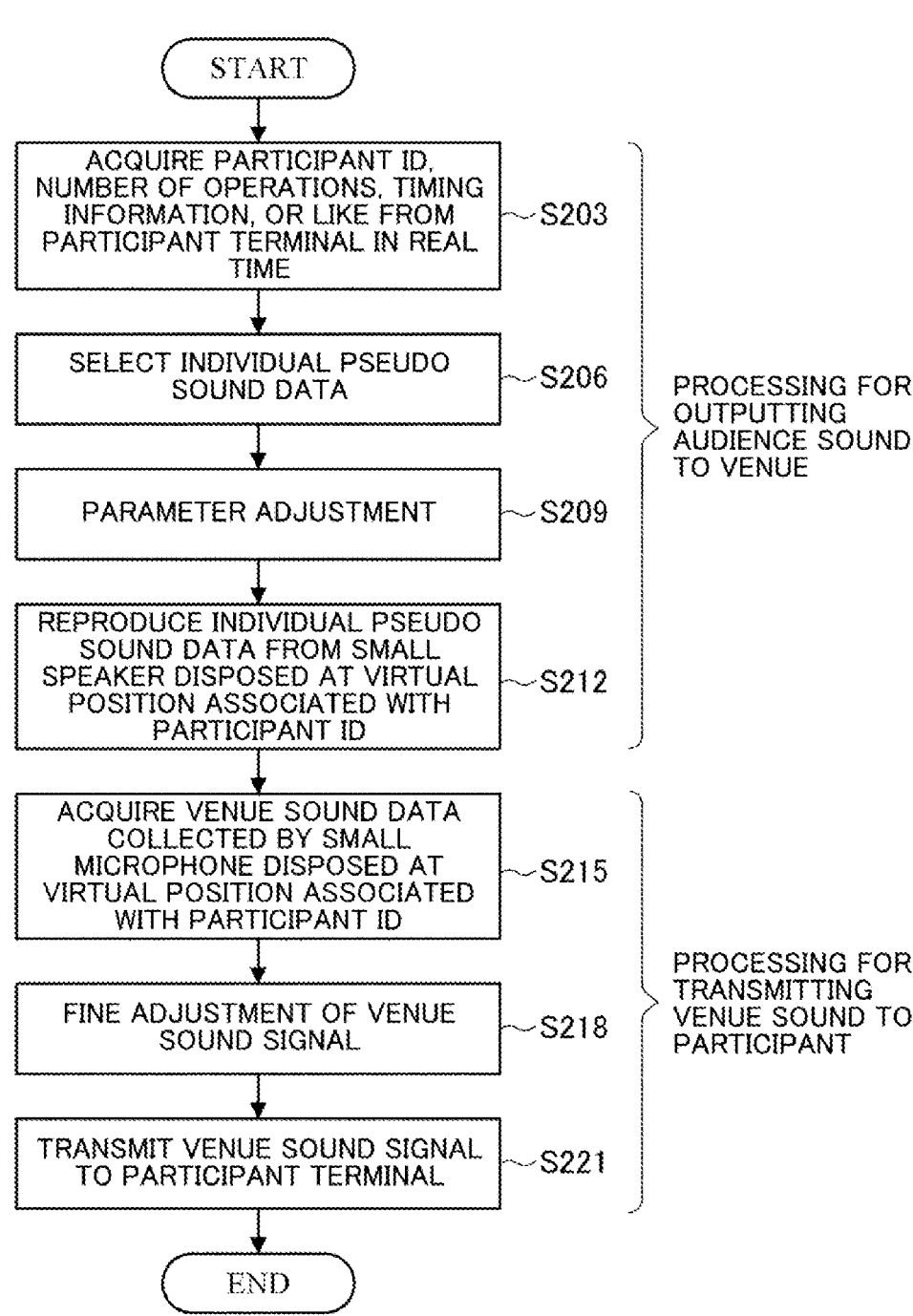
FIG. 10 is a flowchart illustrating an example of a flow of operation processing for outputting individual pseudo sound data in the venue server according to the present embodiment.

Next, operation processing for outputting the individual pseudo sound data according to the present embodiment will be described with reference to FIG. 10. FIG. 10 is a flowchart illustrating an example of a flow of operation processing for outputting the individual pseudo sound data in the venue server 20 according to the present embodiment. The processing illustrated in FIG. 10 can be performed continuously during live distribution.

As illustrated in FIG. 10, first, the venue server 20 acquires the participant ID, the number of operations, timing information, or the like from the participant terminal 10 in real time (step S203). The number of operations or the timing information are examples of operation information.

Next, the pseudo sound generation unit 221 of the venue server 20 selects one piece of individual pseudo sound data from among the one or more pieces of individual pseudo sound data associated with the participant ID according to the number of operations or the timing information (step S206).

Next, the pseudo sound generation unit 221 performs parameter adjustment on the selected individual pseudo sound data as necessary (step S209). For example, the pseudo sound generation unit 221 performs volume adjustment proportional to the number of operations, or timing adjustment (trigger, clapping sound timing, or the like) according to the operation timing. A more specific example of the parameter adjustment will be described with reference to FIGS. 12 and 15 to 17. Further, in some cases, the performer may perform the adjustment through multiplication of a proportional coefficient α designated in advance, according to content of the event, a tone of a song, a genre of the song, and the like. This makes it possible to cause the clapping or cheering sound to have individuality, and to output, in real time, clapping or cheering sound that change according to an atmosphere of the performance even in the case of the same person.

Next, the pseudo sound output control unit 222 performs control for reproducing the individual pseudo sound data from the small speaker (an example of the pseudo sound output apparatus 30) disposed at the virtual position associated with the participant ID (step S212). In the present embodiment, as an example, it is assumed that a small speaker is disposed as the pseudo sound output apparatus 30 at each audience seat in the venue.

Next, the venue sound transmission control unit 223 acquires the venue sound signal collected by the small microphone placed at the virtual position associated with the participant ID (step S215). Here, as an example, it is assumed that a small microphone is disposed as the venue sound acquisition apparatus 40 at each audience seat in the venue.

Further, the venue sound transmission control unit 223 performs fine adjustment (normalization, or the like) of the venue sound signal (step S218), and performs control for transmitting the venue sound signal to the participant terminal 10 (step S221).

A flow of the processing for outputting individual pseudo sound data according to the present embodiment has been specifically described above. Respective steps of the flowchart illustrated in FIG. 10 may be appropriately processed in parallel, or may be processed in reverse order. Further, all the steps may not be processed. For example, the processing shown in steps S203 to S212 is processing for outputting the audience voice (individual pseudo sound data) to the venue, and is continuously and repeatedly processed during live distribution. Further, in parallel with the audience voice output processing, processing for transmitting the venue sound (the venue sound signal) to the participant shown in steps S215 to S221 may be continuously repeatedly processed during the live distribution.

Next, the output of the individual pseudo sound data will be described in greater detail with specific examples.

3-3. Output of Individual Pseudo Clapping Sound Data

First, processing of outputting individual pseudo clapping sound data, which is an example of the individual pseudo sound data, will be described.
(3-3-1. Clapping Operation)

Figure 11:
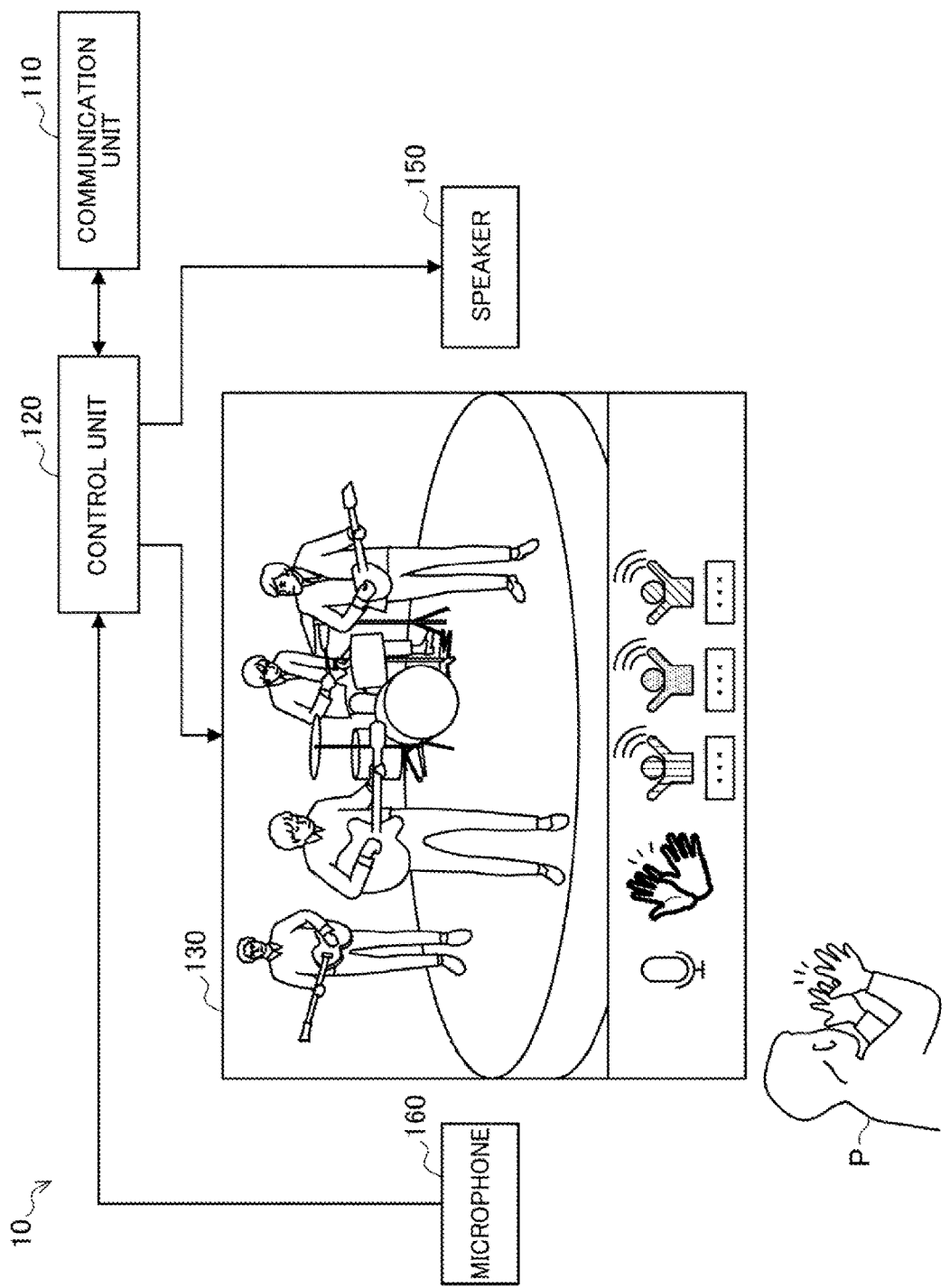
FIG. 11 is a diagram illustrating a clapping operation on the participant side according to the present embodiment.

FIG. 11 is a diagram illustrating a clapping operation on the participant side according to the present embodiment. As illustrated in FIG. 11, the participant terminal 10 includes a communication unit 110, a control unit 120, a display unit 130, a speaker 150, and a microphone 160. Further, although not illustrated in FIG. 11, the participant terminal 10 further includes a storage unit or an operation input unit 140. The participant terminal 10 has a function of outputting a live video or audio distributed by the venue server 20.

The control unit 120 functions as a calculation processing apparatus and a control apparatus, and controls an overall operation within the participant terminal 10 according to various programs. The control unit 120 is realized by an electronic circuit such as a central processing unit (CPU) or a microprocessor. Further, the control unit 120 may include a read only memory (ROM) that stores programs to be used, calculation parameters, or the like, and a random access memory (RAM) that temporarily stores appropriately changing parameters, or the like.

The control unit 120 according to the present embodiment performs control for displaying the live video received from the venue server 20 via the network 70 by the communication unit 110 on the display unit 130 (or projects the live video onto a wall or screen), or control for outputting the venue sound signal from the speaker 150.

The display unit 130 may be a display apparatus such as a liquid crystal display (LCD) or an organic electro luminescence (EL) display. Further, the display unit 130 of the participant terminal 10 may be a projector that projects an image onto a screen or a wall. Further, when the participant terminal 10 is a transparent head mounted display (HMD) that is worn on a head of the participant, the live video or the like may be displayed in augmented reality (AR) on a transparent display unit disposed in front of the participant. Further, the participant terminal 10 may communicatively connect to various display apparatuses and perform control for displaying the live video or the like. In the example illustrated in FIG. 11, a live video and an icon image showing ON/OFF of the microphone input on the participant side, or clapping or cheering sound are displayed on the display unit 130. For example, when the microphone input is ON, the participant P can perform a clapping operation by actually clapping his hands. The control unit 120 analyzes the clapping sound collected by the microphone 160, and transmits the number of times of clapping per unit time or a clapping timing as operation information (a clapping operation command) from the communication unit 110 to the venue server 20 together with the participant ID. The control unit 120 can transmit the operation information or the like to the venue server 20 every unit time.

Further, when the microphone input is OFF, the participant P can perform the clapping operation by clicking the clapping icon image with a mouse, tapping the screen with a finger or the like, or pressing a corresponding predetermined key on the keyboard. In this case, the control unit 120 transmits the number of clicks per unit time, a click timing, or the like as operation information (the clapping operation command) from the communication unit 110 to the venue server 20 together with the participant ID. The operation method is not limited thereto, and the participant P can perform the clapping operation by shaking the controller (which may be a penlight or the like) held with the hand by the participant P or performing a predetermined gesture. These operations can be detected by various sensors (an acceleration sensor, gyro sensor, camera, or the like).

The clapping icon image displayed on the display unit 130 may be controlled to blink according to the operation timing when the clapping operation is received. This makes it possible to feed the reception of the operation back to the participant P.

(3-3-2. Parameter Adjustment of Individual Pseudo Clapping Sound Data)

The pseudo sound generation unit 221 of the venue server 20 selects the individual pseudo clapping sound data on the basis of the participant ID and the operation information transmitted from the participant terminal 10. For example, the pseudo sound generation unit 221 selects the individual pseudo clapping sound data associated with the number of operations per unit time (the number of times of clapping, the number of click operations, the number of tap operations, or the like). The pseudo sound generation unit 221 performs parameter adjustment on the selected individual pseudo clapping sound data on the basis of the operation information.

Figure 12:
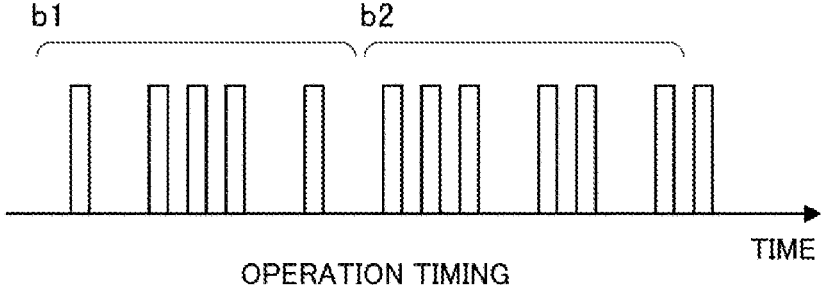
FIG. 12 is a diagram illustrating an example of parameter adjustment of individual pseudo clapping sound data according to the present embodiment.
Figure 12:
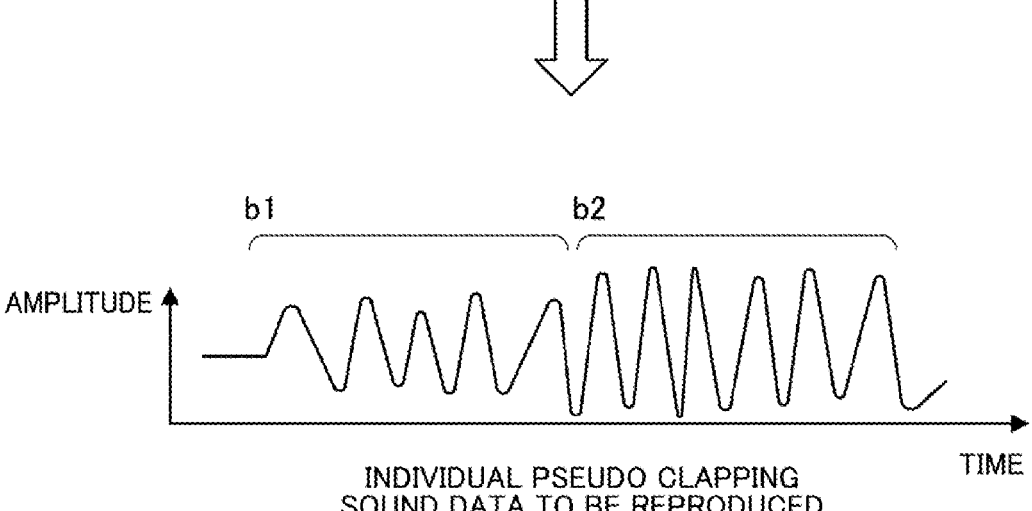

FIG. 12 is a diagram illustrating an example of parameter adjustment for individual pseudo clapping sound data according to the present embodiment. As illustrated in FIG. 12, the pseudo sound generation unit 221 adjusts first individual pseudo clapping sound data according to the number of operations (for example, five times) in a unit time b1 to a volume (amplitude) proportional to the number of operations in the unit time b1, and further adjusts a timing of each of five reproductions of the first individual pseudo clapping sound data according to a timing of each of the five operations. Subsequently, the pseudo sound generation unit 221 adjusts second individual pseudo clapping sound data according to the number of operations (for example, 6 times) in a unit time b2 to a volume (amplitude) proportional to the number of operations in the unit time b2, and adjusts a timing of each of six reproductions of the second individual pseudo clapping sound data according to a timing of each of six operations. Thus, the parameter adjustment (volume or timing) is appropriately performed according to the operation information every unit time and reproduction is performed, making it possible to reproduce the individual pseudo sound data obtained by more realistically reproducing the actual clapping of the participants. Further, in the present system, the individual pseudo clapping sound data can be automatically selected according to the number of operations or the like every unit time.

3-4. Output of Individual Pseudo Cheering Sound Data

Next, processing of outputting the individual pseudo cheering sound data, which is an example of the individual pseudo sound data, will be described. Here, although the processing of outputting the individual pseudo cheering sound data will be mainly described as a representative, the processing of outputting the individual pseudo shouting sound data can be similarly performed.

(3-4-1. Operation of Cheering Sound)

Figure 13:
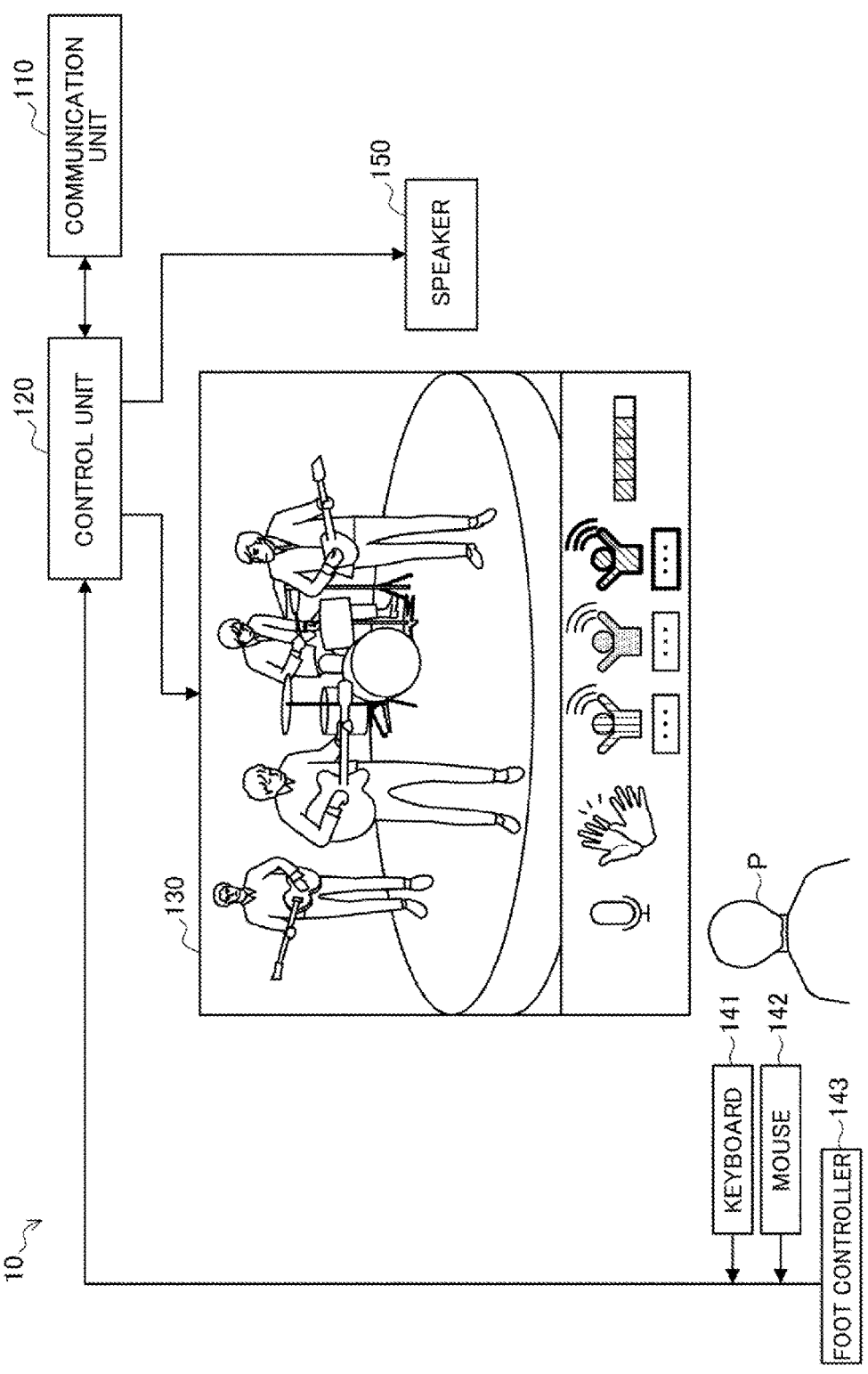
FIG. 13 is a diagram illustrating an operation of a cheering sound on the participant side according to the present embodiment.

FIG. 13 is a diagram illustrating an operation of cheering sound on the participant side according to the present embodiment. In an example illustrated in FIG. 13, examples of the operation input unit 140 included in the participant terminal 10 may include a keyboard 141, a mouse 142, and a foot controller 143.

A live video and an icon image showing ON/OFF of the microphone input on the participant side, or clapping or cheering sound are displayed on the display unit 130. Each icon image showing the cheering sound can be displayed according to the patterns of the cheering sound. These icon images may be displayed in different colors, for example. Further, in each icon image showing the cheering sound, text indicating the pattern of the cheering sound may be displayed. Further, an icon image for performing an operation for outputting shouting sound may be displayed like an icon image for a cheering sound (text indicating content of the shouting sound is also displayed).

The participant P can perform an operation for selecting a cheering sound by clicking an icon image of a cheering sound or the like with a mouse, tapping a screen with a finger or the like, or pressing a predetermined corresponding key on a keyboard. In this case, the control unit 120 transmits information indicating the selected cheering sound pattern (information indicating the selection operation), the number of clicks per unit time, the click timing, or the like as operation information (operation command for the cheering sound or the like) from the communication unit 110 to the venue server 20 together with the participant ID. The information indicating the selection operation may be an ID (cheering sound ID) associated with a pattern of the selected cheering sound or the like. A cheering sound ID can be assigned to individual pseudo cheering sound data to be generated in advance. The control unit 120 may transmit the cheering sound ID selected by the participant P to the venue server 20. Further, since the cheering sound is a sound having a certain length of time, the control unit 120 may record only a time (start timing) at which the icon image for a cheering sound is clicked as operation timing information, and output the time to the venue server 20 as a trigger so that reproduction of the cheering sound is started. Further, the control unit 120 may aggregate the number of clicks per unit time and transmit a result thereof to the venue server 20 as the number of operations.

(3-4-2. Parameter Adjustment of Individual Pseudo Cheering Sound Data)

The pseudo sound generation unit 221 of the venue server 20 selects the individual pseudo cheering sound data on the basis of the participant ID transmitted from the participant terminal 10 and the cheering sound ID (an example of the selection operation information) indicating the cheering sound pattern selected by the participant. The pseudo sound generation unit 221 performs parameter adjustment on the selected individual pseudo cheering sound data on the basis of the operation information.

Figure 14:
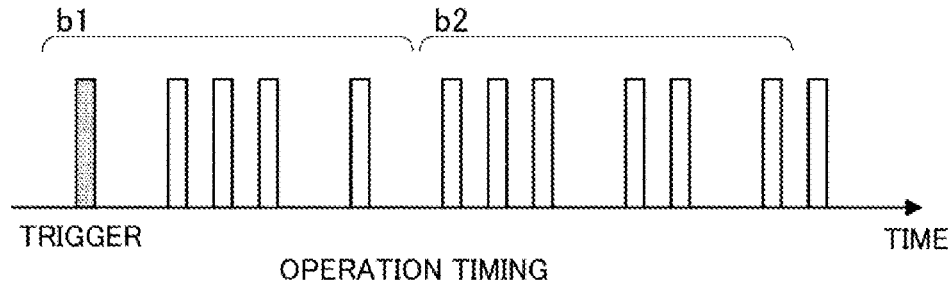
FIG. 14 is a diagram illustrating an example of parameter adjustment of individual pseudo cheering sound data according to the present embodiment.
Figure 14:
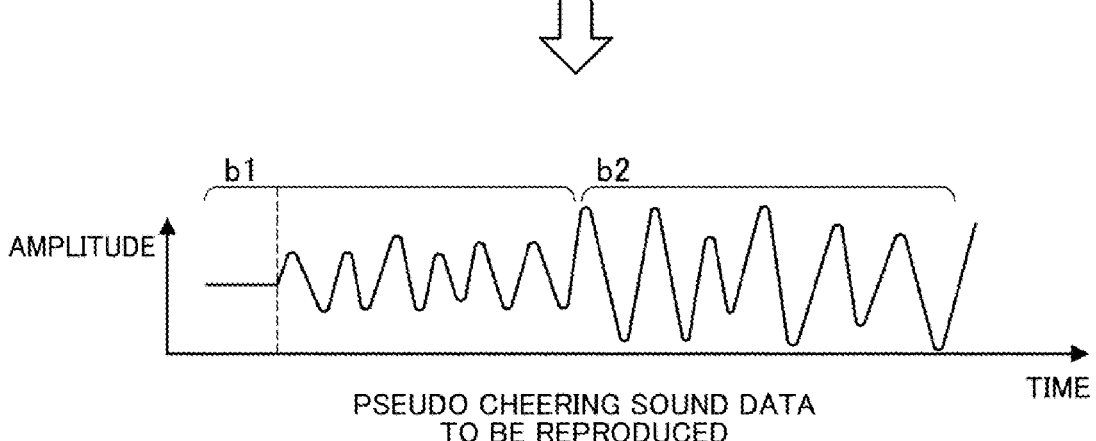

FIG. 14 is a diagram illustrating an example of parameter adjustment of the individual pseudo cheering sound data according to the present embodiment. As illustrated in FIG. 14, the pseudo sound generation unit 221 may start reproduction of the selected individual pseudo cheering sound data, for example, when a trigger is input, and adjust the volume (amplitude) in proportion to the number of operations per unit time while the cheering sound is being reproduced. For example, in the example illustrated in FIG. 14, the reproduction of first individual pseudo cheering sound data corresponding to the selected cheering sound ID is started at a timing when the trigger is input, the first individual pseudo cheering sound data is adjusted to a volume (amplitude) proportional to the number of operations (for example, five times) in the unit time b1, and then, the first individual pseudo cheering sound data is adjusted to a volume (amplitude) proportional to the number of operations (for example, six times) in the unit time b2. The selection of the cheering sound pattern remains active until the sound output of the selected pattern ends (or until the next trigger is input or a predetermined duration ends when it is necessary to utter words for a certain period of time).

Figure 15:
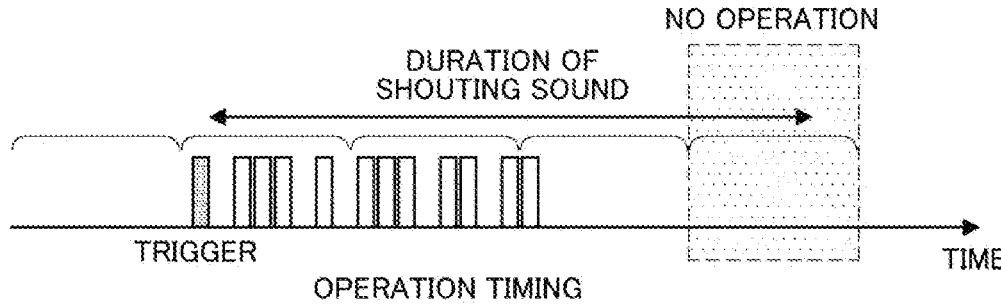
FIG. 15 is a diagram illustrating an example of parameter adjustment of individual pseudo shouting sound data according to the present embodiment.
Figure 15:
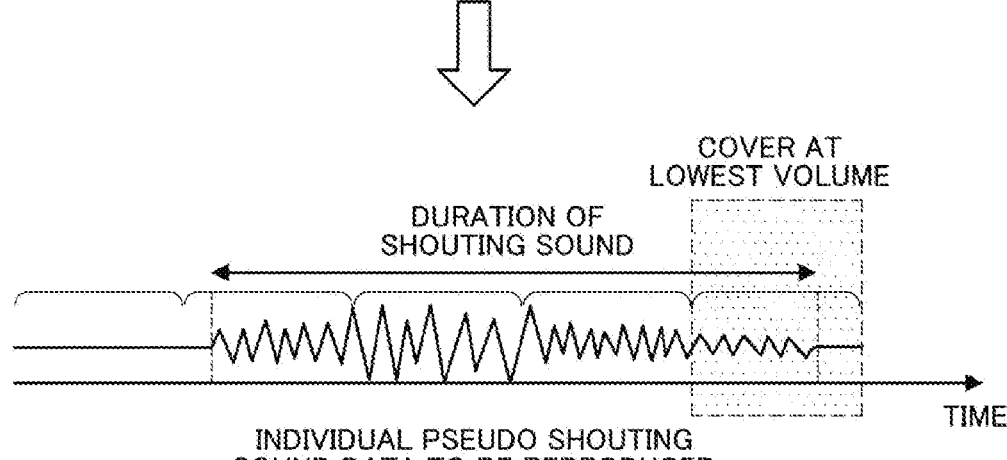

Further, when the volume is adjusted in proportion to the number of operations, the operation should be continued in order to utter an end of a word (for example, an icon image for a shouting sound is continuously hit) in the case of a shouting sound consisting of words (or sentences) having a certain length. When an operation time of the participant P is shorter than the duration of the shouting sound, the sound will disappear on the way. Therefore, after a trigger is sent from the participant terminal 10, the pseudo sound generation unit 221 of the venue server 20 sets a baseline of the volume to a value greater than 0 until the duration of the individual pseudo shouting sound data ends, making it possible to avoid that words disappear on the way. FIG. 15 is a diagram illustrating an example of parameter adjustment of individual pseudo shouting sound data according to the present embodiment. As illustrated in FIG. 15, for example, even when the number of operations included in the unit time is 0 during the duration of the shouting sound reproduced after the trigger is input, the pseudo sound generation unit 221 performs adjustment for a minimum volume, making it possible to avoid the disappearance of the sound.

(Foot Controller 143)

A method of operating cheering sound or shouting sound is not limited to the operation of clicking the icon image described above or the like. For example, when the clapping operation is performed by inputting actual clapping to the microphone, it is difficult to simultaneously click the icon image for a cheering sound or operate the keyboard. Therefore, in the present embodiment, the foot controller 143 operated with the foot may be used for the cheering sound operation.

Figure 16:
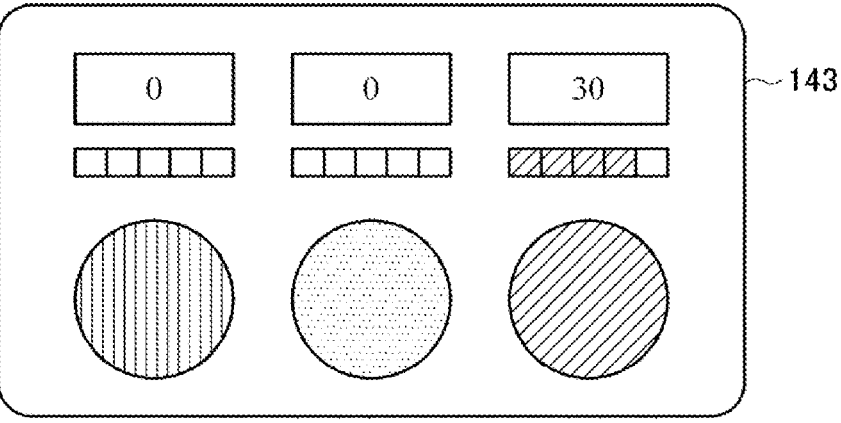
FIG. 16 is a diagram illustrating an example of a foot controller for performing an operation of a cheering sound according to the present embodiment.
Figure 16:
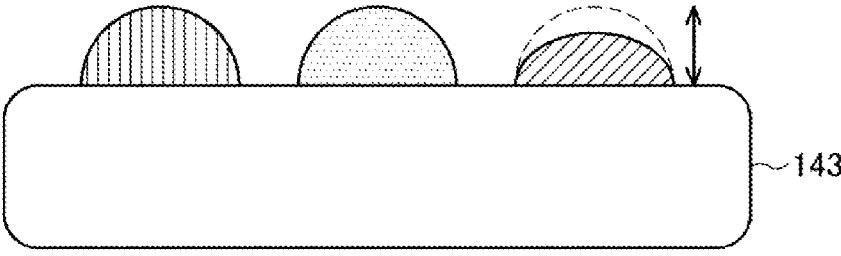

FIG. 16 is a diagram illustrating an example of the foot controller 143 for performing an operation of the cheering sound according to the present embodiment. As illustrated in FIG. 16, for example, the foot controller 143 is provided with a plurality of switches, which are operated by being pressed with a foot. The plurality of switches have different colors or shapes, for example, and correspond to different patterns of cheering sounds. Further, in the case of the foot controller 143, the strength of the operation (strength with which the switch is pressed) can be used for parameter adjustment in the pseudo sound generation unit 221, instead of the number of times of operation.

Each switch of the foot controller 143 may be provided with a sensor that detects pressing. A degree of pressing may be detected by a pressure sensor, or an amount of change in a height of the switch may be detected as illustrated in a lower part of FIG. 16. A switch portion is formed of, for example, a rubber-like elastic member, and the height of the switch portion changes according to a strength of pressing. Further, as illustrated in an upper part of FIG. 16, the foot controller 143 may be provided with a display unit (a pressing force meter) indicating a degree of pressing of each switch.

Figure 17:
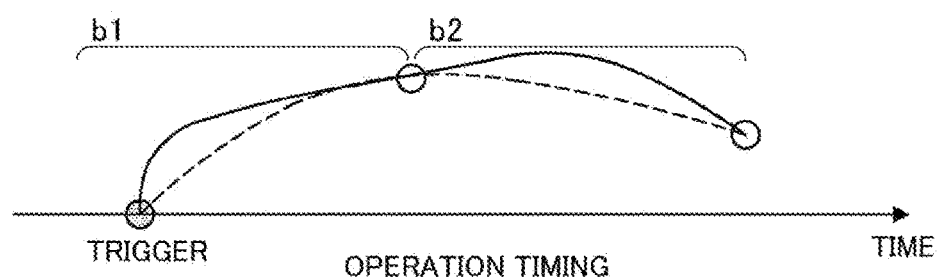
FIG. 17 is a diagram illustrating an example of parameter adjustment of individual pseudo cheering sound data when the foot controller is used according to the present embodiment.
Figure 17:
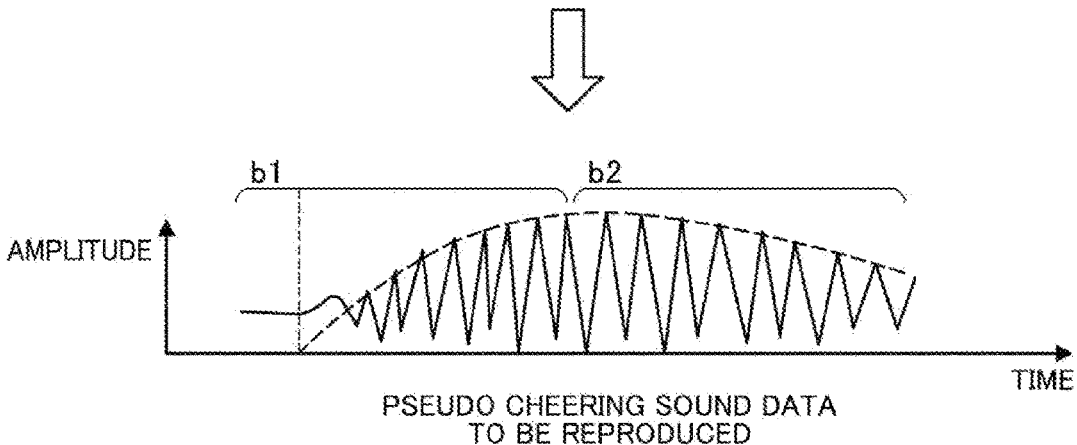

FIG. 17 is a diagram illustrating an example of parameter adjustment of the individual pseudo cheering sound data when the foot controller 143 is used according to the present embodiment. When the foot controller 143 is used, an amount of operation (a strength with which the switch is pressed, an amount of pressing, or an amount of change in height of the switch) changes continuously. The control unit 120 samples the change and transmits the amount of operation to the venue server 20. For example, the control unit 120 may perform sampling at a low frequency in order to reduce the amount of data. Specifically, for example, as illustrated in an upper part of FIG. 17, frequency sampling may be performed every unit time, and only strength information at two points, a start time and the end time, may be transmitted as amount-of-operation information.

The pseudo sound generation unit 221 of the venue server 20 performs interpolation between the two sampled points every unit time, and creates a smooth approximation signal as indicated by a dotted line in the upper part of FIG. 17. The pseudo sound generation unit 221 adjusts the volume (amplitude) of the individual pseudo cheering sound data according to the generated approximation signal, as illustrated in a lower part of FIG. 17. When a trigger time is included in the unit time, the start time is replaced with the trigger time so that an envelope signal of a volume is generated.

Further, in the case of the foot controller 143, when the sound is adjusted according to an amount of operation, the operation must be continued in order to utter a shouting sound requiring a certain duration to an end of the words. Therefore, the pseudo sound generation unit 221 may perform parameter adjustment so that reproduction is continued at the minimum volume within a duration of the shouting sound of the pseudo sound even when the amount-of-operation information (information such as a strength of pressing) included in the unit time is 0. Further, as illustrated in the upper part of FIG. 16, a meter indicating an operation time (a duration of the shouting sound) may be installed at a position corresponding to each switch of the foot controller 143. It clearly indicates that the shouting sound is being uttered while the meter is being lit, making it possible to prompt the participant to consciously continue to operate until the duration of the shouting sound ends. Also considering a case in which it is difficult to see such a meter located at the feet during the live distribution, the control unit 120 may display a control parameter of the foot controller 143 on the display unit 130. For example, the control unit 120 may display a meter indicating the operation time (the duration of the shouting sound) next to the icon image for the cheering sound, so that it clearly indicates that the shouting sound is being uttered while the meter is being lit, as illustrated in FIG. 13. Further, the control unit 120 may change a color depth of the icon image, or the like according to the strength with which the switch of the foot controller 143 is pressed.

4. Modification Examples

Next, modification examples of the live distribution system according to the present embodiment will be described with reference to FIGS. 18 to 21.

In the above-described embodiment, a case in which the small speaker is disposed as an example of the pseudo sound output apparatus 30 at each audience seat in the live venue, and the individual pseudo sound data of the corresponding participant is output from the small speaker, making it possible to give the performers on the stage a feeling as if the audience is actually present in the audience seat has been described. However, it is also assumed that the individual pseudo sound data of each participant is output from a large speaker (another example of the pseudo sound output apparatus) installed toward the performer on the stage or around the stage instead of using a large number of small speakers. In this case, a sense of perspective, a sense of direction, and echo characteristics of the venue (collectively referred to as transfer characteristic) are added to the individual pseudo sound data of each participant to be output, making it possible to give the performer on the stage a feeling as if the sound is heard from the audience seat in the venue.

Further, in the above-described embodiment, the small microphone is used for each audience seat as an example of the venue sound acquisition apparatus 40, but the venue server 20 performs predetermined processing on the venue sound signal output from the mixer (another example of the venue sound acquisition apparatus 40) in the venue even when a large number of small microphones (for example, for the audience seats) cannot be prepared in the venue, making it possible to give the participant a feeling as if the participant is actually listening at the audience seat, in which the echo or the like of the space of the venue is felt. The mixer is an apparatus that individually adjusts various sound sources input from audio devices such as a microphone that collects a voice or performance of the performer, an electronic musical instrument, and various players (for example, a CD player, a record player, and a digital player), mixes the sound sources, and outputs the resultant sound source, and is an example of an audio processing apparatus that collects and appropriately processes sounds in the venue.

Further, the predetermined processing to be performed on the venue sound signal output from the mixer is processing for adding a characteristic such as a sense of perspective, a sense of direction, and an echo of the venue space (these are collectively referred to as a transfer characteristic) corresponding to a virtual position of the audience seat (hereinafter also referred to as a virtual position) in the live venue associated with the participant.

Further, individual echo pseudo sound data including, for example, an echo of a space of the venue is prepared, and all of pieces of individual echo pseudo sound data selected according to reactions of the respective participants may be summed, and transmitted to the participant terminal 10 together with the venue sound signal. The individual echo pseudo sound data is echo pseudo clapping sound, echo pseudo cheering sound, and the like selected according to the reaction of each participant. This makes it possible for the participant to watch the reactions of all audiences in the venue, including the participants themselves, as if the audiences actually listen in the audience seats.

Hereinafter, use of individual echo pseudo sound data and processing for adding transfer characteristic according to the present embodiment will be specifically described.

4-1. Generation of Individual Echo Pseudo Sound Data

In the present modification example, first, audio data of clapping or the like recorded at an actual live venue, that is, echo template pseudo sound data is prepared. The echo template pseudo sound data (echo template clapping sound data or echo template cheering sound data) is recorded in advance at an actual live venue, so that audio data including the echo of the space of the venue can be obtained. Next, before the start of the live distribution, the feature (for example, frequency characteristic) of the sound uttered by the participant is synthesized with the prepared echo template pseudo sound data, thereby generating the individual echo pseudo sound data of each participant.

The individual echo pseudo sound data can be generated by the individual pseudo sound generation server 50, like the individual pseudo sound data. The generated individual echo pseudo sound data can be stored in the storage unit 230 of the venue server 20 in association with the participant ID, like the individual echo pseudo sound data. The individual echo pseudo sound data may be associated with individual pseudo sound data of the same pattern. In this case, a pseudo sound ID may be assigned to each piece of pseudo sound data, and the corresponding pseudo sound ID may be used for association.

The processing for generating the individual echo pseudo sound data is the same as the generation of the individual pseudo sound data, except that properties of the templates used for the generation are different. The individual pseudo sound generation server 50 synthesizes the feature extracted from the clapping sound or cheering sound input to the microphone by the participant with the template pseudo sound data and the echo template pseudo sound data, thereby generating the individual pseudo sound data and the individual echo pseudo sound data.

The template pseudo sound data is sound data such as the clapping or cheering sound recorded in an anechoic environment, and the echo template pseudo sound data is sound data such as clapping or cheering sound recorded in advance in an actual live venue. Further, the echo template pseudo sound data to be used may be echo template pseudo sound data corresponding to the virtual position of the participant in the live venue (that is, sound obtained by recording the clapping sound, cheering sound, or the like performed at an actual place corresponding to the virtual position, at that place).

4-2. Configuration Example of Venue Server 20*a*

Figure 18:
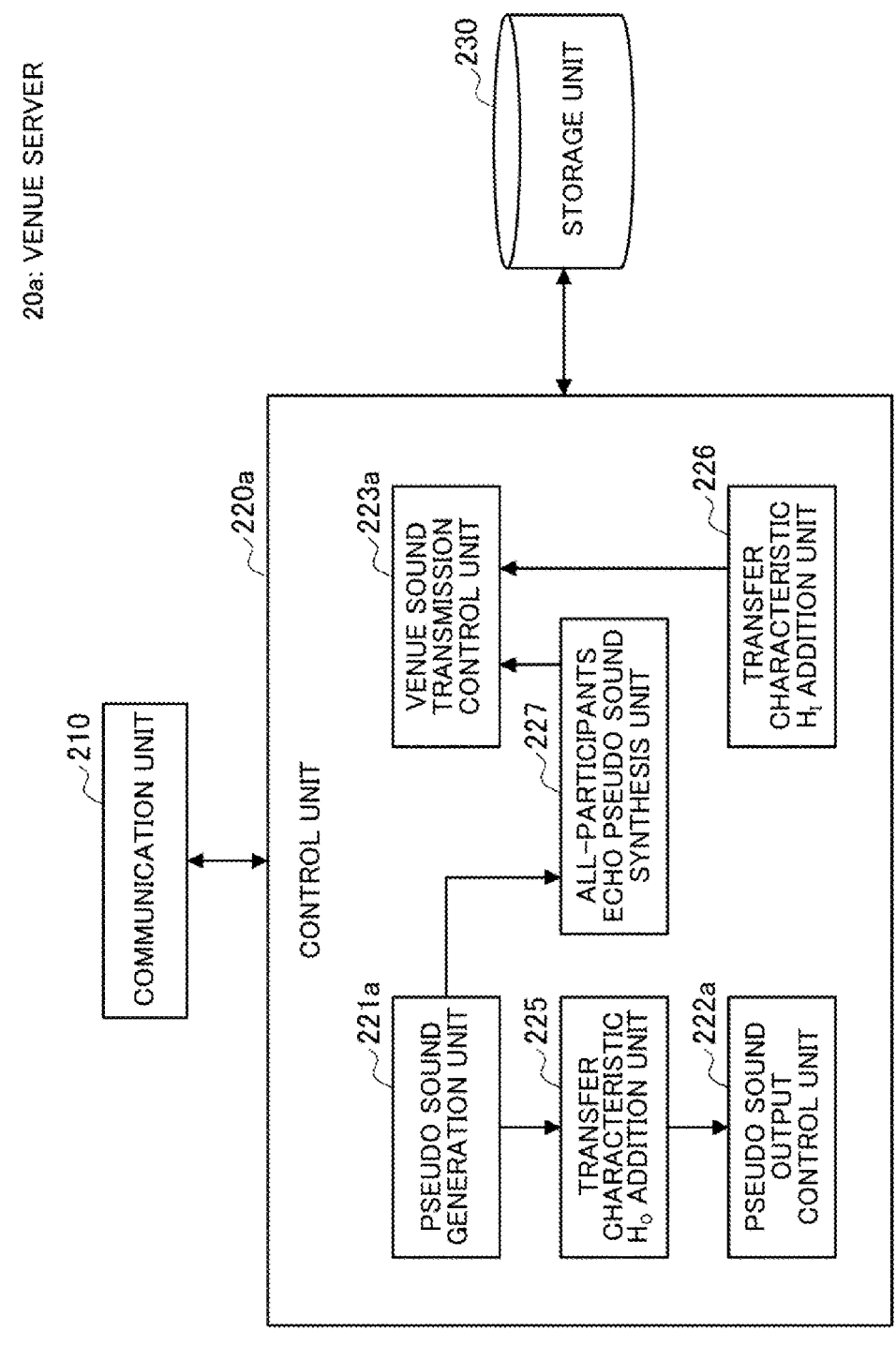
FIG. 18 is a block diagram illustrating an example of a configuration of the venue server according to a modification example of the present embodiment.

FIG. 18 is a block diagram illustrating an example of a configuration of the venue server 20*a* according to the modification example of the present embodiment. As illustrated in FIG. 18, the venue server 20*a* includes a communication unit 210, a control unit 220*a*, and a storage unit 230. Since the configurations of the venue server 20 described with reference to FIG. 9 having the same reference numerals are as described above, detailed description thereof will be omitted here.

The control unit 220*a* according to the present modification example also functions as a pseudo sound generation unit 221*a*, a transfer characteristic $H_O$ addition unit 225, a pseudo sound output control unit 222*a*, a transfer characteristic $H_I$ addition unit 226, an all-participant echo pseudo sound synthesis unit 227, and a venue sound transmission control unit 223*a*.

(Pseudo Sound Generation Unit 221*a*)

The pseudo sound generation unit 221*a* selects individual pseudo sound data on the basis of the participant ID, operation information, and the like acquired from the participant terminal 10 by the communication unit 210. Further, the pseudo sound generation unit 221*a* selects the individual echo pseudo sound data. For example, the pseudo sound generation unit 221*a* selects the individual echo pseudo sound data of the same pattern associated with the selected individual pseudo sound data. As described above, the individual echo pseudo sound data can be generated in advance and stored in the storage unit 230, like the individual pseudo sound data.

The pseudo sound generation unit 221*a* performs parameter adjustment on each of the selected individual pseudo sound data and individual echo pseudo sound data. Details of the parameter adjustment are the same as in the above-described embodiment, and examples thereof may include the volume adjustment proportional to the number of operations, and the adjustment of the output timing according to the operation timing.

(Transfer Characteristic $H_O$ Addition Unit 225)

The transfer characteristic $H_O$ addition unit 225 adds the transfer characteristic $H_O$ of the echo of the venue measured in advance to the individual pseudo sound data output from the pseudo sound generation unit 221a. The transfer characteristic $H_O$ is a transfer characteristic from the audience seats to the stage of the venue (around a place at which the performer is present). The transfer characteristic $H_O$ is added to the individual pseudo sound data, making it possible to cause the performer to feel as if the audience is present in a space of the venue even when small venue speakers cannot be disposed at respective audience seats in the venue and, for example, only one large speaker 32 (an example of the pseudo sound output apparatus 30) can be installed at the feet in front of the performer on the stage.

Figure 19:
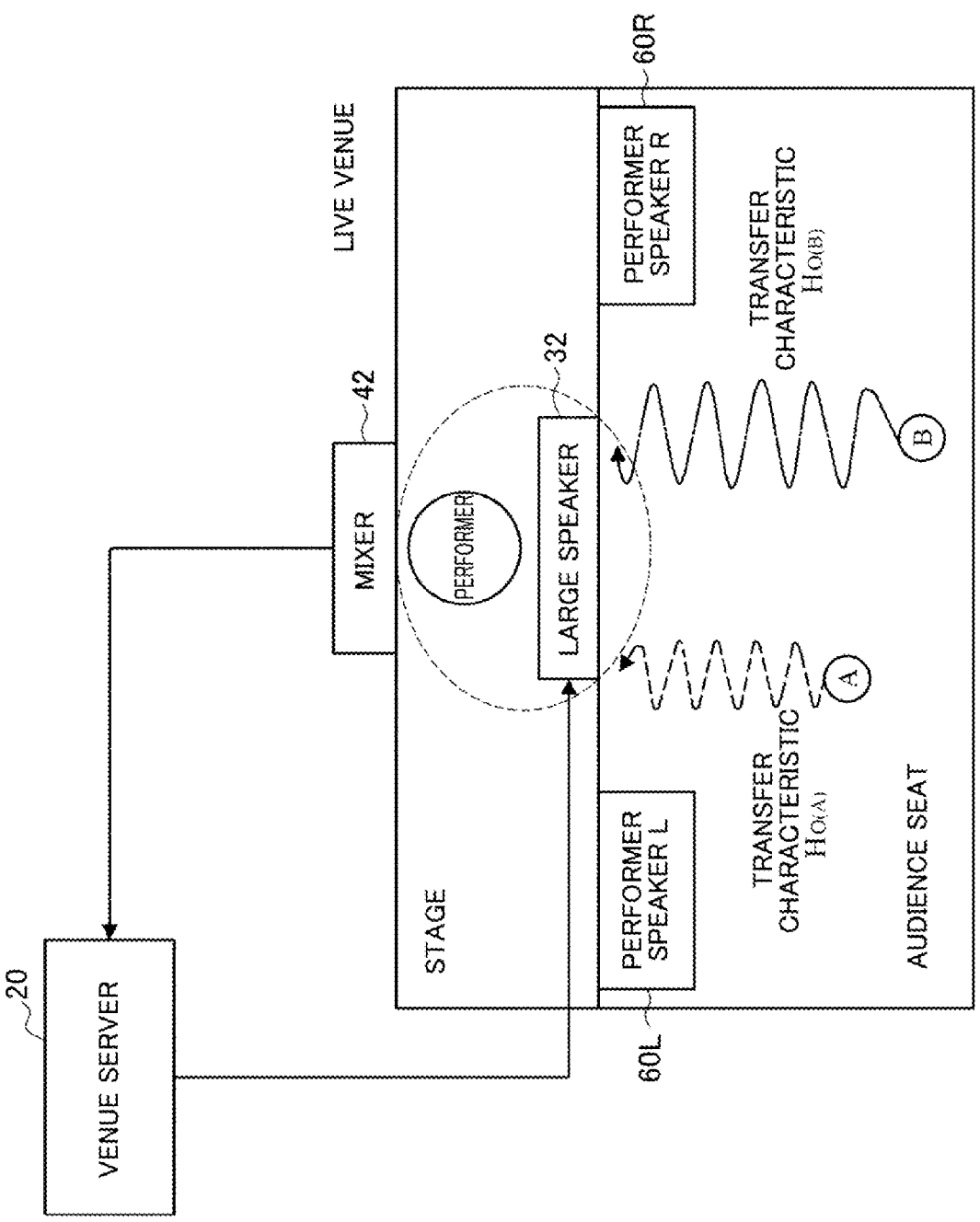
FIG. 19 is a diagram illustrating a transfer characteristic $H_O$ according to a modification example of the present embodiment.

FIG. 19 is a diagram illustrating the transfer characteristic $H_O$ according to the modification example of the present embodiment. As illustrated in FIG. 19, a stage and audience seats are provided in the live venue, and an ID (audience seat ID) is assigned to each seat. In the example illustrated in FIG. 19, a virtual position (virtual position) of participant A and a virtual position of participant B in the live venue are illustrated.

With the audience seat corresponding to the virtual position as a start point and the vicinity of the performer (for example, a portion surrounded by a broken line) as a sound reception point, transfer characteristic ($H_{O(A)}$, $H_{O(B)}$) from respective audience seats (A and B) are measured. The measurement of the transfer characteristic $H_O$ can be performed on all the audience seats.

Further, the sound reception point may be changed appropriately. For example, when the performer does not move on the stage, a position at which the performer stands may be set as a sound reception point, and when the performer moves to some extent or when there are a plurality of performers, at least one large speaker 32 disposed, for example, at the feet in front of the performer in the live venue (a composite audio output apparatus that outputs individual pseudo sound data of all the participants toward the performer) may be set as the sound reception point.

The measured transfer characteristic $H_O$ is stored in the storage unit 230 of the venue server 20 in association with the audience seat ID. The transfer characteristic $H_O$ addition unit 225 acquires the corresponding transfer characteristic $H_O$ on the basis of the audience seat ID (the virtual position) associated with the participant ID. Next, the transfer characteristic $H_O$ addition unit 225 adds the acquired transfer characteristic $H_O$ to the individual pseudo sound data selected by the pseudo sound generation unit 221a.

(Pseudo Sound Output Control Unit 222a)

The pseudo sound output control unit 222a sums the individual pseudo sound data to which the transfer characteristic $H_O$ has been added by the transfer characteristic $H_O$ addition unit 225 for all the participants, and performs control for outputting a result of the summation from the large speaker 32.

(Transfer Characteristic $H_I$ Addition Unit 226)

The transfer characteristic $H_I$ addition unit 226 adds, to the venue sound signal output from the mixer 42 (an example of the venue sound acquisition apparatus 40), a transfer characteristic $H_I$ from a performer speaker 60 (audio output apparatus) provided toward the audience seat in the venue to output the venue sound signal input from the mixer 42 to each audience seat. In the present embodiment, sound sources from various audio devices such as a microphone or musical instrument used by the performer in the live venue are mixed by, for example, the mixer 42, output from the performer speaker 60 toward the audience seats in the live venue, and distributed to the participant terminal 10. Here, the transfer characteristic $H_I$ is added to the venue sound signal to be transmitted to the participant terminal 10, making it possible to reproduce a feeling as if the participant listens to the sound of the venue at each audience seat.

Figure 20:
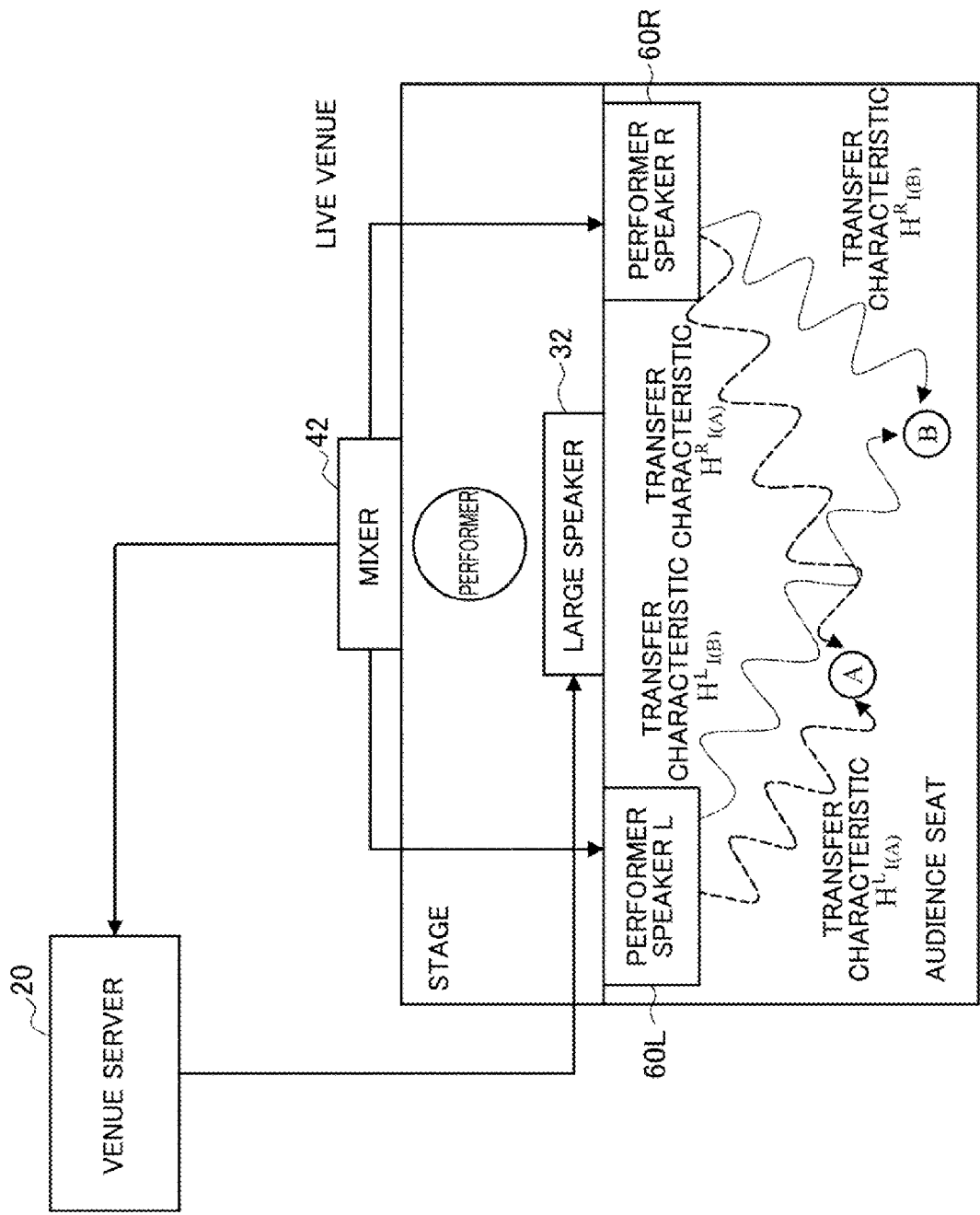
FIG. 20 is a diagram illustrating a transfer characteristic $H_I$ according to a modification example of the present embodiment.

The transfer characteristic $H_I$ can be measured in advance before the live distribution starts. FIG. 20 is a diagram illustrating the transfer characteristic $H_I$ according to the modification example of the present embodiment. As illustrated in FIG. 20, a live venue is provided with a stage and audience seats, and each seat is assigned an ID (audience seat ID). In the example illustrated in FIG. 20, the virtual position of participant A and the virtual position of participant B in the live venue are illustrated. For the performer speakers installed in the venue, two speakers (a performer speaker 60R and a performer speaker 60L) provided on the left and right sides of the stage are assumed as an example. For the respective audience seats (A and B) corresponding to the virtual position, transfer characteristic ($H^R_{I(A)}$, $H^L_{I(A)}$, $H^R_{I(B)}$, and $H^L_{I(B)}$) from both the left and right performer speakers 60R and 60L are measured. The transfer characteristic $H_I$ can be measured for all the audience seats.

The measured transfer characteristic $H_I$ is stored in the venue server 20 in association with the audience seat ID. The transfer characteristic $H_I$ addition unit 226 acquires the corresponding transfer characteristic $H_I$ on the basis of the audience seat ID (virtual position) associated with the participant ID. Next, the transfer characteristic $H_I$ addition unit 226 adds the acquired transfer characteristic $H_I$ to the venue sound signal output from the mixer 42. Accordingly, a sound simulating a sound space at the time of listening to a performance or the like at each audience seat in the venue is synthesized.

(All-Participant Echo Pseudo Sound Synthesis Unit 227)

The all-participant echo pseudo sound synthesis unit 227 has a function of summing all of the pieces of individual echo pseudo sound data of all the participants output from the pseudo sound generation unit 221a. Since the venue sound signal output from the mixer 42 is only an output of the microphone or musical instrument of the performer, a player, or the like connected to the mixer 42, the venue sound signal does not include, for example, the clapping sound or cheering sound of all the audiences. Therefore, all the pieces of individual echo pseudo sound data of the respective participants are summed and transmitted to the participant terminal 10 together with the venue sound signal by the venue sound transmission control unit 223a, making it possible to deliver reactions of all the participants simulating echoes in the venue, that is, the clapping sound, cheering sound, or the like matching the sound space of the venue to the participants. This makes it possible for the participant to watch the reactions of all the audiences in the venue, including the participants themselves, as if the participant actually listens in the audience seat.

(Venue Sound Transmission Control Unit 223a)

The venue sound transmission control unit 223a performs control for transmitting the venue audio (venue sound signal) output from the mixer 42 and the individual echo pseudo sound data of all the participants synthesized by the all-participant echo pseudo sound synthesis unit 227 to the participant terminal 10.

The configuration of the venue server 20a according to the present modification example has been specifically described above. The configuration illustrated in FIG. 18 is an example, and the present disclosure is not limited thereto. For example, the venue server 20a may be configured of a plurality of apparatuses. Further, all the configurations illustrated in the venue server 20a may not be included.

4-3. Processing of Adding Transfer Characteristic

Figure 21:
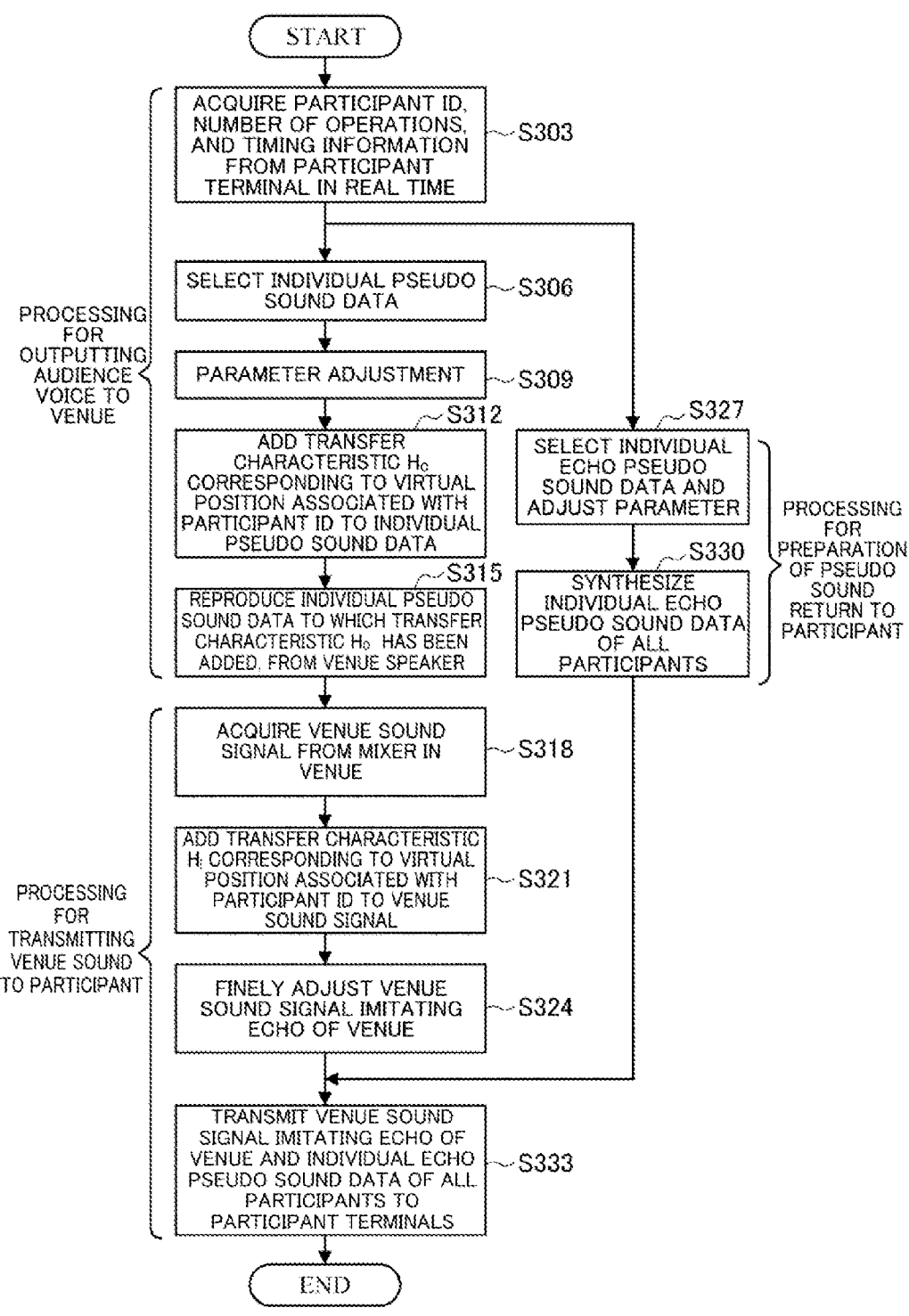
FIG. 21 is a flowchart illustrating an example of a flow of transfer characteristic addition processing according to a modification example of the present embodiment.

FIG. 21 is a flowchart illustrating an example of a flow of transfer characteristic addition processing according to a modification example of the present embodiment.

As illustrated in FIG. 21, first, the venue server 20a acquires the participant ID, the number of operations, the timing information, or the like from the participant terminal 10 in real time (step S303). The number of operations or the timing information are examples of the operation information.

Next, the pseudo sound generation unit 221 of the venue server 20 selects one piece of individual pseudo sound data from among the one or more pieces of individual pseudo sound data associated with the participant ID according to the number of operations or the timing information (step S306).

Next, the pseudo sound generation unit 221 performs parameter adjustment on the selected individual pseudo sound data as necessary (step S309).

Next, the transfer characteristic H$_O$ addition unit 225 adds the transfer characteristic H$_O$ corresponding to the virtual position (for example, audience seat ID) in the live venue associated with the participant ID to the individual pseudo sound data (step S312).

Next, the pseudo sound output control unit 222a performs control for reproducing the individual pseudo sound data to which the transfer characteristic H$_O$ has been added, from the large speaker 32 (step S315). The transfer characteristic H$_O$ is a transfer characteristic from a predetermined audience seats to the stage in which the performer is present, as described above. The pseudo sound output control unit 222a synthesizes the individual pseudo sound data to which the transfer characteristic H$_O$ corresponding to the respective virtual positions of all the participants are added, and performs control for output (reproduction) from the large speaker 32. The large speaker 32 is a large speaker disposed toward the performer on the stage, for example, at the feet in front of the performer in the live venue, but the individual pseudo sound data to which the transfer characteristic H$_O$ taking the virtual position of the participant into consideration has been added is output, making it possible to give the performer on the stage a sense of perspective, a sense of direction, and a sense of echo in the venue as if the clapping or cheering sound is delivered from the audience seat in the live venue.

Subsequently, the venue server 20a acquires the venue sound signal from the mixer 42 in the venue (step S318).

Next, the transfer characteristic H$_f$ addition unit 226 adds the transfer characteristic H$_f$ corresponding to the virtual position (audience seat ID) associated with the participant ID to the venue sound signal (step S321). The transfer characteristic H$_f$ is, for example, a transfer characteristic from the performer speaker 60 to a predetermined audience seat, as described above. This makes it possible to generate a venue sound signal for reproducing, for example, an echo in a space of the live venue taking the virtual position of the participant into consideration.

Next, the venue sound transmission control unit 223a finely adjusts (normalizes, or the like) the venue sound signal that imitates the echo of the venue (step S324).

Further, on the other hand, the pseudo sound generation unit 221a selects one of the pieces of individual echo pseudo sound data associated with the participant ID on the basis of the operation information received from the participant terminal 10, and performs parameter adjustment on the basis of the operation information or the like (step S327). Such processing may be performed in parallel with the processing shown in step S306. Further, the pseudo sound generation unit 221a may select the individual echo pseudo sound data (pseudo sound data of the same pattern) associated with the individual pseudo sound data selected in the processing shown in step S306. The pseudo sound generation unit 221a performs the volume adjustment proportional to the number of operations, the timing adjustment according to the operation timing, and the like on the selected individual echo pseudo sound data, similarly to the parameter adjustment shown in step S309.

Next, the all-participant echo pseudo sound synthesis unit 227 synthesizes individual echo pseudo sound data (subjected to parameter adjustment) of all participants (step S330).

The venue sound transmission control unit 223a performs control for transmitting the venue sound signal that imitates the echo of the venue and the individual echo pseudo sound data of all the participants to the participant terminals 10 (step S333). This makes it possible for the participant to actually watch the venue sound signal obtained by reproducing the echo of the space of the live venue taking the virtual position of the participant into consideration, and the reactions of all the audiences in the venue, including the participants themselves as if the participant hears from the audience seats.

A flow of transfer characteristic adding processing according to the modification example of the present embodiment has been specifically described above. Respective steps of the flowchart illustrated in FIG. 21 may be processed in parallel appropriately, or may be processed in reverse order. Further, all the steps may not be processed. For example, the processing shown in steps S303 to S315 is processing for outputting the audience voice (individual pseudo sound data) to the venue, and is continuously and repeatedly processed during live distribution. Further, in parallel with the audience voice output processing, processing for preparation of pseudo sound return to the participant shown in steps S327 to S330 and processing for transmitting venue sound (venue sound signal) to the participant shown in steps S318 to S333 may be continuously repeatedly processed during the live distribution.

5. Supplements

Although the preferred embodiments of the present disclosure have been described in detail with reference to the accompanying drawings, the present disclosure is not limited to such examples. It is obvious that anyone with ordinary knowledge in the technical field of the present disclosure may conceive various modification examples or change examples within the scope of the technical ideas set forth in the claims and, of course, it is understood that these belong to the technical scope of the present disclosure.

For example, the embodiments and the modification examples described above may be combined appropriately. As an example, while the venue server 20 outputs the individual pseudo sound data according to the reaction of each participant from the small speaker provided at each audience seat, the venue sound signal (the transfer characteristic $H_I$ has been added) acquired from the mixer 42 and the individual echo pseudo sound data of all the participants may be transmitted to the participant terminal 10.

Further, the individual pseudo sound data according to the reaction of each participant may be output from at least one large speaker disposed toward the performer on the stage or the like without being subjected to processing for adding the transfer characteristic $H_O$ by the venue server 20.

Further, it is also possible to create one or more computer programs for causing hardware such as a CPU, a ROM, and a RAM incorporated in the participant terminal 10, the venue server 20, or the individual pseudo sound generation server 50 described above to function as the participant terminal 10, the venue server 20, or the individual pseudo sound generation server 50. Further, a computer-readable storage medium having the one or more computer programs stored therein is provided.

Further, effects described in the present specification are merely descriptive or illustrative and are not limited. That is, the technology according to the present disclosure may exhibit other effects apparent to those skilled in the art from the description in the present specification, in addition to or in place of the above effects.

The present technology can also have the following configuration.

(1)

An information processing apparatus including: a control unit configured to perform control for selecting individual pseudo sound data corresponding to acquired reaction information indicating a reaction of a participant from one or more pieces of individual pseudo sound data reflecting a feature of a sound uttered by the participant, and outputting the selected individual pseudo sound data from an audio output apparatus installed in a venue.

(2)

The information processing apparatus according to (1), wherein the control unit selects individual pseudo sound data corresponding to the reaction information of the participants acquired in real time at a place different from the venue, and performs control for output from the audio output apparatus to a performer in the venue.

(3)

The information processing apparatus according to (1) or (2), wherein the reaction information of the participant includes at least one of information indicating the number of times of operation of the participant, information indicating an operation timing of the participant, information indicating an amount of operation, and information of a spectrum obtained by performing frequency analysis on a sound uttered by the participant, and a selection operation information of the participant.

(4)

The information processing apparatus according to (3), wherein the one or more pieces of individual pseudo sound data are one or more different pieces of individual pseudo clapping sound data, and the control unit selects corresponding individual pseudo clapping sound data from the one or more different pieces of individual pseudo clapping sound data on the basis of at least one of the number of times of clapping by the participant in a certain period of time, the number of click operations, the number of tap operations, or a spectrum.

(5)

The information processing apparatus according to (4), wherein the reaction information of the participant includes information indicating a timing of clapping by the participant, and the control unit adjusts an output timing of the selected individual pseudo clapping sound data according to the timing of the clapping.

(6)

The information processing apparatus according to (4) or (5), wherein the reaction information of the participant includes information indicating the number of times of clapping by the participant, and the control unit adjusts a volume of the individual pseudo clapping sound data to be output, according to the number of times of clapping in a certain period of time.

(7)

The information processing apparatus according to (3), wherein the one or more pieces of individual pseudo sound data are one or more different pieces of individual pseudo cheering sound data or individual pseudo shouting sound data, and the control unit selects corresponding individual pseudo cheering sound data or individual pseudo shouting sound data according to a selection operation by the participant.

(8)

The information processing apparatus according to (7), wherein the control unit starts to output the selected individual pseudo cheering sound data or individual pseudo shouting sound data using a start timing of a selection operation by the participant as a trigger, and performs control for changing a volume of the output individual pseudo cheering sound data or individual pseudo shouting sound data in real time according to the number of times of the selection operation or an amount of operation of the selection operation.

(9)

The information processing apparatus according to (7) or (8), wherein the control unit performs adjustment so that output continues at least at a minimum volume until an end of a duration of the individual pseudo shouting sound data.

(10)

The information processing apparatus according to any one of (1) to (9), wherein the control unit performs control for outputting the selected individual pseudo sound data from an individual audio output apparatus disposed at a virtual position of the participant in the venue.

(11)

The information processing apparatus according to (10), wherein the control unit performs control for transmitting a venue sound signal acquired from an individual sound collection apparatus disposed at the virtual position of the participant in the venue to a participant terminal used by the participant at a place different from the venue.

(12)

The information processing apparatus according to any one of (1) to (9), wherein the control unit performs control for adding a transfer characteristic from a virtual position of the participant in the venue to a performer in the venue to the selected individual pseudo sound data, and performing output from a composite audio output apparatus disposed around the performer in the venue.

(13)

The information processing apparatus according to any one of (1) to (9), wherein the control unit performs control for transmitting a venue sound signal acquired from an audio processing apparatus configured to collect a sound source from an audio device in the venue to a participant terminal used by the participant present at a place different from the venue.

(14)

The information processing apparatus according to (13), wherein the control unit performs control for adding transfer characteristic from an audio output apparatus configured to output the venue sound signal toward audience seats in the venue to the virtual position of the participant in the venue to the venue sound signal acquired from the audio processing apparatus, and then, performing transmission to the participant terminal.

(15)

The information processing apparatus according to (13) or (14), wherein the control unit selects the individual echo pseudo sound data corresponding to reaction information indicating a real-time reaction of the participant from one or more pieces of individual echo pseudo sound data generated in advance by reflecting characteristics of the sound emitted by the participant in the echo pseudo sound data including an echo of the venue, synthesizes the selected pieces of individual echo pseudo sound data of all participants, and transmits the synthesized individual echo pseudo sound data of all the participants to the participant terminals together with the venue sound signal.

(16)

The information processing apparatus according to any one of (1) to (9), wherein the control unit performs control for adding transfer characteristic from an audio output apparatus configured to output the venue sound signal toward audience seats in the venue to the virtual position of the participant in the venue to the venue sound signal acquired from an audio processing apparatus configured to collect a sound source from an audio device in the venue, and then, performing transmission to the participant terminal.

(17)

An information processing apparatus including a control unit configured to perform:

processing for reflecting a feature of a sound uttered by a participant in sound data of a template to generate individual pseudo sound data, and processing for storing the generated individual pseudo sound data in association with the participant.

(18)

The information processing apparatus according to (17), wherein the control unit synthesizes one or both of frequency characteristics and time characteristics obtained by analyzing a sound uttered by the participant with the sound data of the template to generate the individual pseudo sound data.

(19)

The information processing apparatus according to (17) or (18), further including a communication unit, wherein the communication unit receives a feature of a sound uttered by the participant collected and analyzed by a participant terminal used by the participant, and transmits the generated individual pseudo sound data to a venue server configured to perform control for outputting the individual pseudo sound data from an audio output apparatus installed in the venue in association with identification information of the participant.

32

(20)

An information processing method including:

performing, by a processor, control for selecting individual pseudo sound data corresponding to acquired reaction information indicating a reaction of a participant from one or more pieces of individual pseudo sound data reflecting a feature of a sound uttered by the participant, and outputting the selected individual pseudo sound data from an audio output apparatus installed in a venue.

(21)

A program causing a computer to function as:

a control unit configured to perform control for selecting individual pseudo sound data corresponding to acquired reaction information indicating a reaction of a participant from one or more pieces of individual pseudo sound data reflecting a feature of a sound uttered by the participant, and outputting the selected individual pseudo sound data from an audio output apparatus installed in a venue.

(22)

An information processing method including:

reflecting, by a processor, a feature of a sound uttered by a participant in sound data of a template to generate individual pseudo sound data, and storing, by the processor, the generated individual pseudo sound data in association with the participant.

(23)

A program causing a computer to function as a control unit configured to perform processing for reflecting a feature of a sound uttered by a participant in sound data of a template to generate individual pseudo sound data, and processing for storing the generated individual pseudo sound data in association with the participant.

(24)

A system including: a participant terminal used by a participant, and a server that controls output from an audio output apparatus installed in a venue, wherein the server includes a communication unit configured to receive reaction information indicating a reaction of the participant from the participant terminal; and a control unit configured to perform control for selecting individual pseudo sound data corresponding to the received reaction information indicating the reaction of the participant from one or more pieces of individual pseudo sound data reflecting a feature of the sound uttered by the participant, and outputting the selected individual pseudo sound data from the audio output apparatus.

REFERENCE SIGNS LIST

10 Participant terminal
110 Communication unit
120 Control unit
130 Display unit
140 Operation input unit
150 Speaker
160 Microphone
20, 20*a* Venue server
210 Communication unit
220, 220*a* Control unit
221, 221*a* Pseudo sound generation unit
222, 222*a* Pseudo sound output control unit
223, 223*a* Venue sound transmission control unit
225 Transfer characteristic H$_O$ addition unit

33

226 Transfer characteristic H_f addition unit
227 All-participant echo pseudo sound synthesis unit
230 Storage unit
30 Pseudo sound output apparatus
40 Venue sound acquisition apparatus
50 Individual pseudo sound generation server
510 Communication unit
520 Control unit
521 Actual sound analysis unit
522 Individual pseudo sound data generation unit
523 Storage control unit
530 Storage unit
60 Performer speaker
70 Network

The invention claimed is:

1. An information processing apparatus, comprising:
a control unit configured to:
  acquire reaction information from a participant terminal of a participant;
  select individual pseudo sound data corresponding to the acquired reaction information, wherein
    the acquired reaction information indicates a reaction of the participant from at least one piece of individual pseudo sound data, and
    the at least one piece of individual pseudo sound data reflects feature of a sound uttered by the participant;
  output, from an audio output apparatus installed in a venue, the selected individual pseudo sound data;
  acquire a venue sound signal from an audio processing apparatus, wherein the audio processing apparatus collects a sound source from an audio device in the venue;
  add a transfer characteristic to the venue sound signal, from the audio output apparatus that outputs the venue sound signal toward audience seats in the venue to a virtual position of the participant in the venue; and
  transmit, the transfer characteristic added venue sound signal, to the participant terminal present at a place different from the venue.

2. The information processing apparatus according to claim 1, wherein the control unit is further configured to:
select the individual pseudo sound data corresponding to the acquired reaction information of the participant acquired in a real time at the place different from the venue; and
output, from the audio output apparatus, to a performer in the venue.

3. The information processing apparatus according to claim 1, wherein the acquired reaction information of the participant includes at least one of information indicating a number of times of operation of the participant, information indicating an operation time of the participant, information indicating an amount of operation, information of a spectrum based on frequency analysis on the sound uttered by the participant, or a selection operation information of the participant.

4. The information processing apparatus according to claim 3, wherein
the at least one piece of individual pseudo sound data is at least one or more different piece of individual pseudo clapping sound data, and
the control unit is further configured to select corresponding individual pseudo clapping sound data from the at least one different piece of individual pseudo clapping sound data based on at least one of a number of times of a clapping operation by the participant in a certain period of time, a number of click operations, a number of tap operations, or the spectrum.

5. The information processing apparatus according to claim 4, wherein
the acquired reaction information of the participant includes information indicating a time of the clapping operation by the participant, and
the control unit is further configured to adjust an output time of the selected individual pseudo clapping sound data based on the time of the clapping operation.

6. The information processing apparatus according to claim 4, wherein
the acquired reaction information of the participant includes information indicating the number of times of the clapping operation by the participant, and
the control unit is further configured to adjust a volume of the individual pseudo clapping sound data to be output, based on the number of times of the clapping operation in the certain period of time.

7. The information processing apparatus according to claim 3, wherein
the at least one piece of individual pseudo sound data is at least one different piece of individual pseudo cheering sound data or individual pseudo shouting sound data, and
the control unit is further configured to select corresponding individual pseudo cheering sound data or individual pseudo shouting sound data based on a selection operation by the participant.

8. The information processing apparatus according to claim 7, wherein the control unit is further configured to:
start to output the selected individual pseudo cheering sound data or individual pseudo shouting sound data based on a start time of the selection operation by the participant as a trigger; and
change a volume of the output individual pseudo cheering sound data or individual pseudo shouting sound data in a real time based on a number of times of the selection operation or an amount of operation of the selection operation.

9. The information processing apparatus according to claim 7, wherein the control unit is further configured to perform adjustment so that the output continues at least at a minimum volume until an end of a duration of the individual pseudo shouting sound data.

10. The information processing apparatus according to claim 1, wherein the control unit is further configured to:
add a transfer characteristic, from the virtual position of the participant in the venue to a performer in the venue, to the selected individual pseudo sound data; and
output from a composite audio output apparatus around the performer in the venue.

11. The information processing apparatus according to claim 1, wherein the control unit is further configured to:
select individual echo pseudo sound data corresponding to the acquired reaction information indicating a real-time reaction of the participant from at least one piece of individual echo pseudo sound data, wherein the at least one piece of individual echo pseudo sound data is generated beforehand based on reflecting characteristics of sound emitted by the participant in the individual echo pseudo sound data including an echo of the venue;
synthesize individual echo pseudo sound data of a plurality of participants; and

transmit the synthesized individual echo pseudo sound data of the plurality of participants to a plurality of participant terminals together with the venue sound signal.

12. An information processing apparatus, comprising:

a communication unit configured to receive a feature of a sound uttered by a participant, collected and analyzed by a participant terminal of the participant; and a control unit configured to:

reflect the feature in sound data of a template to generate individual pseudo sound data; and store the generated individual pseudo sound data in association with the participant, wherein the communication unit is further configured to transmit the generated individual pseudo sound data to a venue server, wherein the venue server:

acquires reaction information from the participant terminal;

selects the individual pseudo sound data corresponding to the acquired reaction information, wherein the acquired reaction information indicates a reaction of the participant from at least one piece of individual pseudo sound data that reflects the feature;

outputs, from an audio output apparatus installed in a venue in association with identification information of the participant, the selected individual pseudo sound data;

acquires a venue sound signal from an audio processing apparatus, wherein the audio processing apparatus collects a sound source from an audio device in the venue;

adds a transfer characteristic to the venue sound signal, from the audio output apparatus that outputs the venue sound signal toward audience seats in the venue to a virtual position of the participant in the venue; and transmits, the transfer characteristic added venue sound signal, to the participant terminal present at a place different from the venue.

13. The information processing apparatus according to claim 12, wherein the control unit is further configured to synthesize at least one of frequency characteristics or time characteristics based on an analysis of the sound uttered by the participant with the sound data of the template to generate the individual pseudo sound data.

14. An information processing method, comprising:

by a processor;

acquiring reaction information from a participant terminal of a participant;

selecting individual pseudo sound data corresponding to the acquired reaction information, wherein the acquired reaction information indicates a reaction of the participant from at least one piece of individual pseudo sound data, and the at least one piece of individual pseudo sound data reflects a feature of a sound uttered by the participant;

outputting, from an audio output apparatus installed in a venue, the selected individual pseudo sound data;

acquiring a venue sound signal from an audio processing apparatus, wherein the audio processing apparatus collects a sound source from an audio device in the venue;

adding a transfer characteristic to the venue sound signal, from the audio output apparatus that outputs the venue sound signal toward audience seats in the venue to a virtual position of the participant in the venue; and transmitting, the transfer characteristic added venue sound signal, to the participant terminal present at a place different from the venue.

15. A non-transitory computer-readable medium having stored thereon computer-executable instructions that, when executed by a processor, cause the processor to execute operations, the operations comprising:

acquiring reaction information from a participant terminal of a participant;

selecting individual pseudo sound data corresponding to the acquired reaction information, wherein the acquired reaction information indicates a reaction of the participant from at least one piece of individual pseudo sound data, and the at least one piece of individual pseudo sound data reflects a feature of a sound uttered by the participant;

outputting, from an audio output apparatus installed in a venue, the selected individual pseudo sound data;

acquiring a venue sound signal from an audio processing apparatus, wherein the audio processing apparatus collects a sound source from an audio device in the venue;

adding a transfer characteristic to the venue sound signal, from the audio output apparatus that outputs the venue sound signal toward audience seats in the venue to a virtual position of the participant in the venue; and transmitting, the transfer characteristic added venue sound signal, to the participant terminal present at a place different from the venue.

* * * * *